US012799238B2

(12) United States Patent
Tohjima et al.

(10) Patent No.: US 12,799,238 B2
(45) Date of Patent: Nov. 17, 2026

(54) MALEIMIDE RESIN, AMINE RESIN, CURABLE RESIN COMPOSITION, AND CURED PRODUCT THEREOF

(71) Applicant: NIPPON KAYAKU KABUSHIKI KAISHA, Tokyo (JP)

(72) Inventors: Takayuki Tohjima, Tokyo (JP); Masataka Nakanishi, Tokyo (JP); Masanori Hashimoto, Tokyo (JP); Atsuhiko Hasegawa, Tokyo (JP); Daichi Hijikata, Tokyo (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 551 days.

(21) Appl. No.: 18/290,325

(22) PCT Filed: May 11, 2022

(86) PCT No.: PCT/JP2022/019967
§ 371 (c)(1),
(2) Date: Nov. 13, 2023

(87) PCT Pub. No.: WO2022/239811
PCT Pub. Date: Nov. 17, 2022

(65) Prior Publication Data

US 2024/0262941 A1 Aug. 8, 2024

Related U.S. Application Data

(60) Provisional application No. 63/188,688, filed on May 14, 2021.

(51) Int. Cl.
*C08F 8/46* (2006.01)
*C08F 8/32* (2006.01)
(Continued)

(52) U.S. Cl.
CPC .................. *C08F 8/46* (2013.01); *C08F 8/32* (2013.01); *C08F 212/08* (2013.01); *C08F 257/02* (2013.01)

(58) Field of Classification Search
None
See application file for complete search history.

(56) References Cited

U.S. PATENT DOCUMENTS

2007/0134586 A1* 6/2007 Maeda .................. G03F 7/0382 430/270.1

FOREIGN PATENT DOCUMENTS

JP S50129649 A * 10/1985
JP H04359911 A * 12/1992
(Continued)

OTHER PUBLICATIONS

JP-H06179848-A, machine translation, 1994 (Year: 1994).*
(Continued)

*Primary Examiner* — Satya B Sastri
(74) *Attorney, Agent, or Firm* — GREENBLUM & BERNSTEIN, P.L.C.

(57) ABSTRACT

The present invention provides: a maleimide resin which has good curing properties and demonstrates excellent heat resistance and electrical properties; an amine resin derived from the maleimide resin; and a curable resin composition
(Continued)

and a cured product thereof. The maleimide resin has repeating units of the following formulae (a), (b), and (c):

(a)

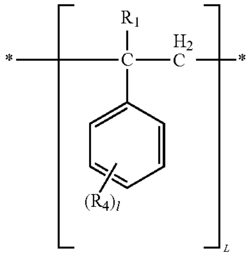

(b)

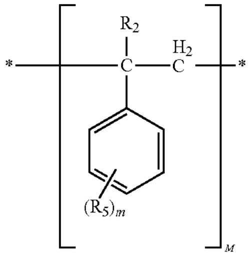

(c)

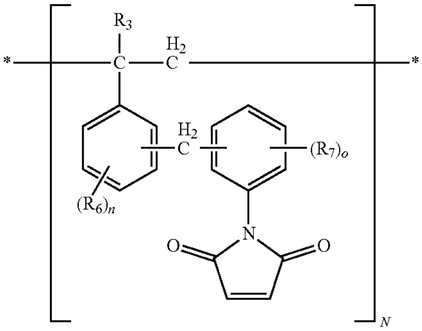

In the above formulae, $R_1$ to $R_7$ represent a hydrogen atom, a hydrocarbon group having 1 to 10 carbon atoms, or a halogenated alkyl group. "l" and "m" each represent a real number of 0 to 5; "n" and "o" represent a real number of 0 to 4. Each of L and M independently represents a real number of 0 to 20, and N represents a real number of 1 to 20. (a), (b), and (c) are joined by *, respectively, and the repeating positions may be random.

20 Claims, 17 Drawing Sheets

(51) Int. Cl.
*C08F 212/08* (2006.01)
*C08F 257/02* (2006.01)

(56) References Cited

FOREIGN PATENT DOCUMENTS

| | | |
|---|---|---|
| JP | H06-057090 A | 3/1994 |
| JP | H06179848 A * | 6/1994 |

OTHER PUBLICATIONS

JP-S50129649-A, machine translation, 1985 (Year: 1985).*
JP-H04359911-A, machine translation, 1992 (Year: 1992).*
ISR issued in International Patent Application No. PCT/JP2022/019967, Jul. 19, 2022, translation.
Written Opinion issued in Int'l Patent Application No. PCT/JP2022/019967, Jul. 19, 2022, translation.
Zhou, Hui et al., "N-Heteroyclic Carbene Functionalized Polymer for Reversible Fixation-Release of $CO_2$", Macromolecules, 2009, vol. 42, pp. 5419-5421.

* cited by examiner

MALEIMIDE RESIN, AMINE RESIN, CURABLE RESIN COMPOSITION, AND CURED PRODUCT THEREOF

TECHNICAL FIELD

The present invention relates to a maleimide resin, an amine resin from which the maleimide resin is derived, a curable resin composition, and a cured product thereof, and is suitably used for semiconductor sealing materials, electric and electronic components such as printed wiring substrates and build-up laminated boards, light weight and high strength materials such as carbon fiber-reinforced plastics and glass fiber-reinforced plastics, and 3D printing applications.

BACKGROUND ART

In recent years, properties required for laminated boards are broadening and sophisticated with the expansion of the use of the laminated boards for mounting electrical and electronic components. Conventional semiconductor chips were mainly mounted on metal lead frames. Semiconductor chips with high processing capacity such as central processing units (hereinafter referred to as CPU) are increasingly mounted on laminated boards made of polymer materials.

In the fifth-generation communication system "5G", which is currently being developed at an accelerated rate, it is expected that a further increase in capacity and high-speed communication will progress. There is an increasing need for materials with a low dielectric loss tangent, requiring at least a dielectric loss tangent of 0.005 or less at 1 GHz.

Further, computerization is progressing in the field of automobiles, and precision electronic equipment may be disposed in the vicinity of an engine driving unit, and therefore, higher levels of heat resistance and moisture resistance are required. SiC semiconductors have begun to be used in electric trains, air conditioners, and the like. A sealing material for semiconductor devices is required to have extremely high heat resistance, and thus, traditional epoxy resin sealing material cannot be used.

In view of such circumstances, polymer materials capable of achieving both heat resistance and electrical properties have been studied. For example, Patent Literature 1 proposes a composition containing a maleimide resin and a propenyl group-containing phenolic resin. However, since a phenolic hydroxy group that do not participate in a reaction remains during a curing reaction, it cannot be said that the electrical properties are sufficient.

In addition, in recent years, 3D printing has attracted attention as a technique of three-dimensional shaping. This 3D printing technique has begun to be applied in the fields where reliability is required, such as aerospace, vehicles, and connectors for electronic components used for them. In particular, photocurable and thermosetting resins have been studied for applications represented by stereo lithography (SLA) and digital light processing (DLP). Therefore, stability and accuracy of a shape are mainly required in a common method of transferring a shape from a mold, but in a 3D printing application, various properties such as heat resistance, mechanical properties, toughness, flame retardancy, and electrical properties are required, and development of materials thereof is advanced.

CITATION LIST

Patent Literature

Patent Literature 1: Japanese Patent Application Publication No. H04-359911

SUMMARY

Technical Problem

The present invention has been made in view of such circumstances. An object of the present invention is to provide a maleimide resin, an amine resin from which the maleimide resin is derived, a curable resin composition, and a cured product thereof, which exhibit excellent low water absorption, heat resistance, and electrical properties and have good curability.

Solution to Problem

As a result of intensive studies to solve the above problem, the present inventors have discovered that a cured product of a maleimide resin derived from an amine resin having a specific structure is excellent in low water absorption, heat resistance, and low dielectric properties, and completed the present invention.

That is, the present invention relates to the following [1] to [8].

[1]

A maleimide resin having repeating units of the following formulae (a), (b), and (c).

(a)

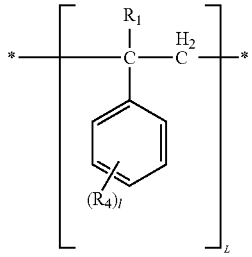

(b)

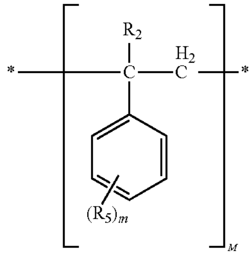

-continued (c)

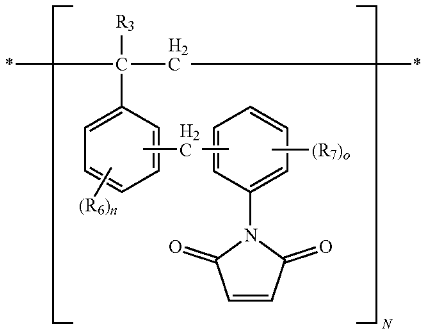

In the above formulae, $R_1$ to $R_7$ represent a hydrogen atom, a hydrocarbon group having 1 to 10 carbon atoms, or a halogenated alkyl group. "1" and "m" each represent a real number of 0 to 5; "n" and "o" represent a real number of 0 to 4. Each of L and M independently represents a real number of 0 to 20, and N represents a real number of 1 to 20. (a), (b), and (c) are bonded to each other by *, and the repeating positions may be random.

[2]

The maleimide resin according to the preceding [1], wherein in the formulae (a), (b), and (c), $R_1$ is a methyl group, $R_2$ is a hydrogen atom, and $R_3$ is a methyl group or a hydrogen atom.

[3]

A maleimide resin obtained by a reaction of an amine resin having repeating units of the following formulae (a), (b), and (d) with maleic acid or maleic anhydride.

(a)

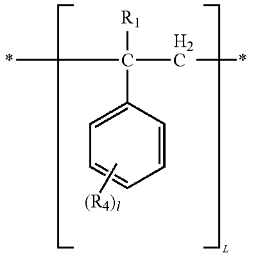

(b)

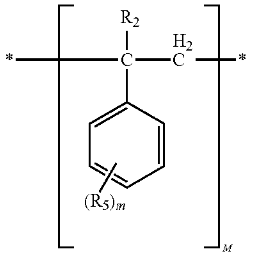

-continued (d)

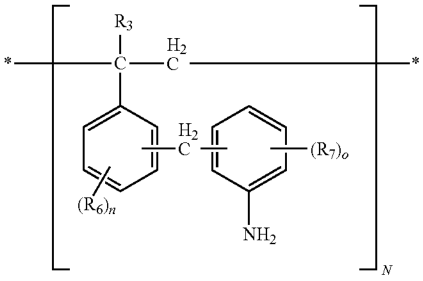

In the above formulae, $R_1$ to $R_7$ represent a hydrogen atom, a hydrocarbon group having 1 to 10 carbon atoms, or a halogenated alkyl group. "1" and "m" each represent a real number of 0 to 5; "n" and "o" represent a real number of 0 to 4. Each of L and M independently represents a real number of 0 to 20, and N represents a real number of 1 to 20. (a), (b), and (d) are bonded to each other by *, and the repeating positions may be random.

[4]

A curable resin composition containing the maleimide resin according to any one of the preceding [1] to [3].

[5]

The curable resin composition according to the preceding [4], further comprising a curable resin other than the maleimide resin.

[6]

The curable resin composition according to the preceding [4] or [5], further comprising a curing accelerator.

[7]

A cured product obtained by curing the maleimide resin according to any one of the preceding [1] to [3], or the curable resin composition according to any one of the preceding [4] to [6].

[8]

An amine resin having repeating units of the following formulae (a), (b), and (d).

(a)

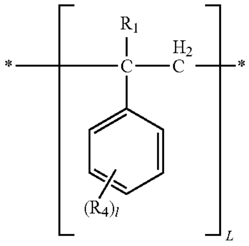

(b)

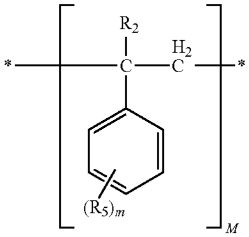

-continued (d)

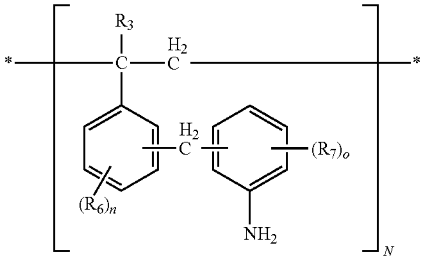

In the above formulae, $R_1$ to $R_7$ represent a hydrogen atom, a hydrocarbon group having 1 to 10 carbon atoms, or a halogenated alkyl group. "1" and "m" each represent a real number of 0 to 5; "n" and "o" represent a real number of 0 to 4. Each of L and M independently represents a real number of 0 to 20, and N represents a real number of 1 to 20. (a), (b), and (d) are bonded to each other by *, and the repeating positions may be random.

Advantageous Effect of the Invention

The maleimide resin of the present invention has excellent curability, and the cured product thereof has excellent properties such as high heat resistance and low dielectric properties. Therefore, it is a useful material for sealing electric and electronic components, circuit boards, carbon fiber composite materials, and the like.

In addition, it is one of the preferred embodiments of the maleimide resin of the present invention to be cured alone.

DESCRIPTION OF EMBODIMENTS

Figure 1:
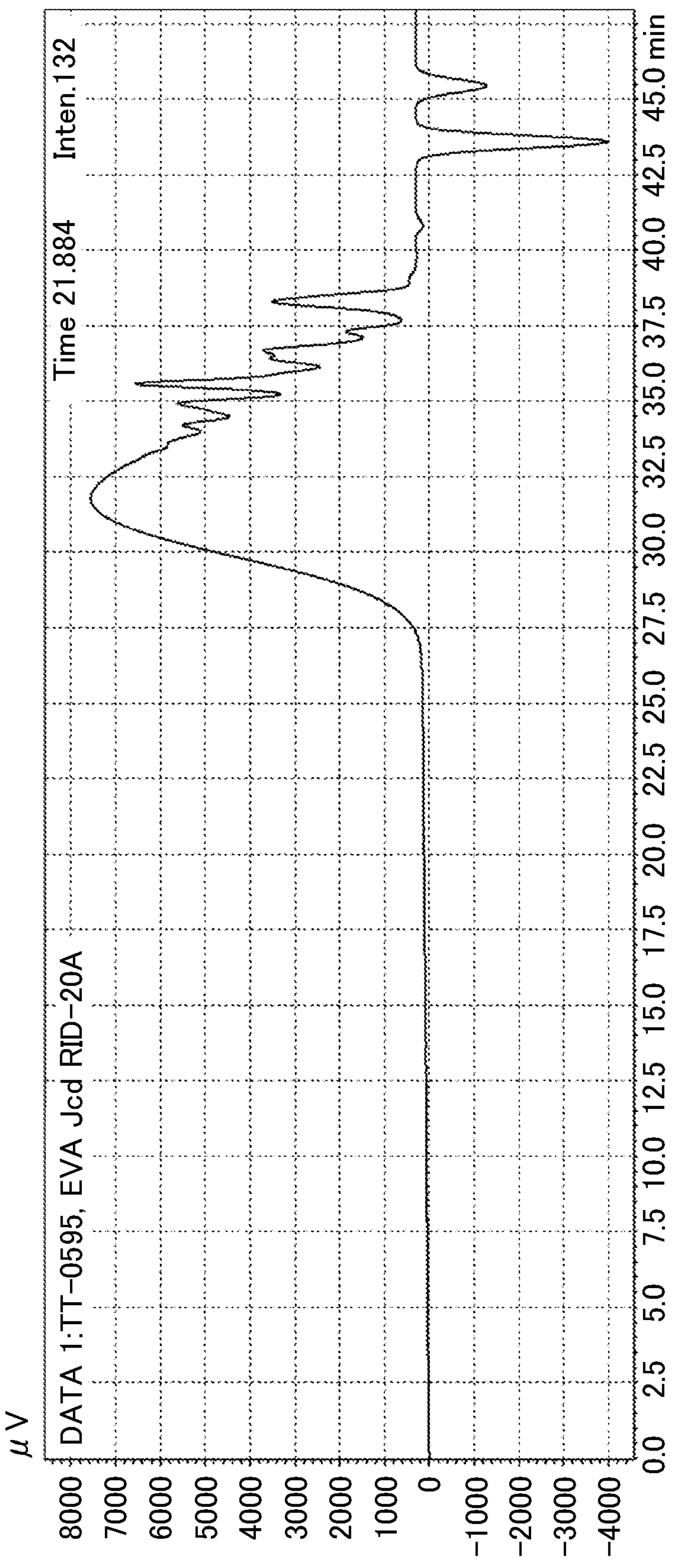
FIG. 1 shows a GPC chart of Synthesis Example 1.

The maleimide resin of the present invention has repeating units of the following formulae (a), (b), and (c).

(a)

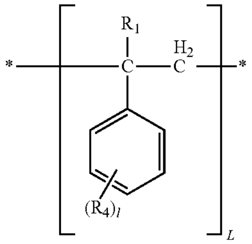

-continued (b)

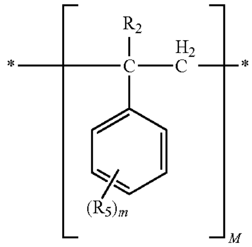

(c)

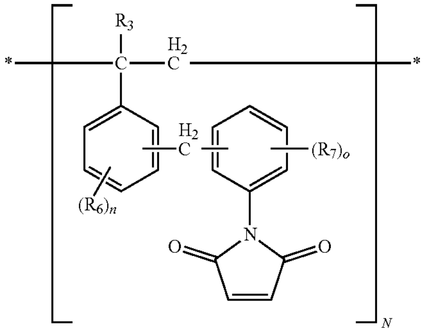

In the above formulae, $R_1$ to $R_7$ represent a hydrogen atom, a hydrocarbon group having 1 to 10 carbon atoms, or a halogenated alkyl group. "1" and "m" each represent a real number of 0 to 5; "n" and "o" represent a real number of 0 to 4. Each of L and M independently represents a real number of 0 to 20, and N represents a real number of 1 to 20. (a), (b), and (c) are bonded to each other by *, and the repeating positions may be random.

In the formulae (a), (b), and (c), $R_1$ to $R_7$ generally represent a hydrogen atom, a hydrocarbon group having 1 to 10 carbon atoms, or a halogenated alkyl group, preferably a hydrogen atom or a hydrocarbon group having 1 to 5 carbon atoms, and more preferably a hydrogen atom or a hydrocarbon group having 1 to 3 carbon atoms. $R_1$ particularly preferably represents a methyl group or a hydrogen atom, and most preferably a methyl group. $R_2$ and $R_3$ particularly preferably represent a methyl group or a hydrogen atom, and most preferably a hydrogen atom. When $R_1$ to $R_7$ represent any one of the above, molecular vibration is less likely to occur when the maleimide resin is exposed to high frequencies, thus excellent electrical properties are obtained.

In the formulae (a), (b) and (c), "1" and "m" generally are 0 to 5, preferably 0 to 2, and more preferably 0. Generally, "n" and "o" are 0 to 4, preferably 0 to 2, and more preferably 0.

In the formulae (a), (b), and (c), L and M represent average values of the number of repetitions, respectively. L and M are 0 to 20, and the lower limit value thereof is preferably 1, more preferably 1.1, and particularly preferably 2. The upper limit value thereof is preferably 10, and more preferably 5. In the formulae (a), (b), and (c), N is an average value of the number of repetitions. N is 1 to 20, the lower limit value thereof is preferably 1.1, and more preferably 2. The upper limit value thereof is preferably 10, and more preferably 5. When N is equal to or higher than the lower limit, the heat resistance is improved as the density of functional group increases. On the other hand, if N is equal to or lower than the upper limit, the water absorption is reduced as the density of functional group of the maleimide having polarity decreases.

A weight average molecular weight (Mw) of the maleimide resin (hereinafter also referred to as a component (A)) having repeating units of the above formulae (a), (b), and (c) measured by gel permeation chromatography (GPC) is preferably 200 to less than 5,000, more preferably 500 to less than 4,000, and particularly preferably 1,000 to less than 3,000. The number average molecular weight (Mn) is preferably 200 to less than 5,000, more preferably 500 to less than 3,000, and particularly preferably 1,000 to less than 2,000. When the weight average molecular weight and the number average molecular weight are within the above ranges, purification by water washing is facilitated, and the target compound does not volatilize in the solvent distillation step.

The component (A) may be represented by the following formula (1).

(1)

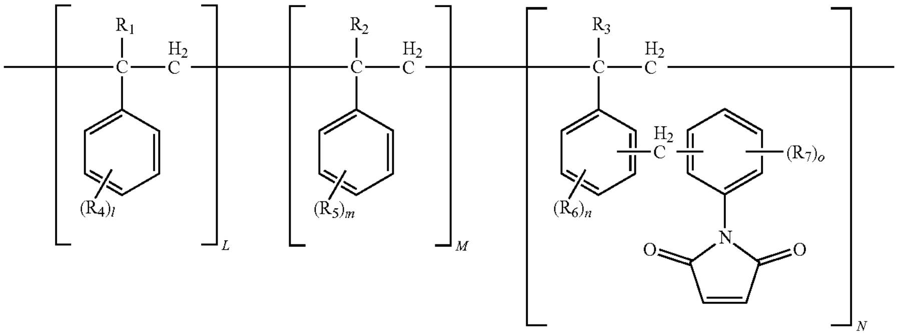

In formula (2), $R_1$ to $R_7$ represent a hydrogen atom, a hydrocarbon group having 1 to 10 carbon atoms, or a halogenated alkyl group. "l" and "m" each represent a real number of 0 to 5; "n" and "o" represent a real number of 0 to 4. Each of L and M independently represents a real number of 0 to 20, and N represents a real number of 1 to 20. Each repeating unit is shown in a specific order for convenience of description, but each repeating position may be random.

The component (A) is obtained by a reaction of an amine resin (hereinafter also referred to as a component (B)) having a repeating unit of each of the following formulae (a), (b), and (d) with maleic acid or maleic anhydride.

(a)

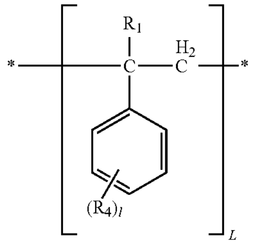

(b)

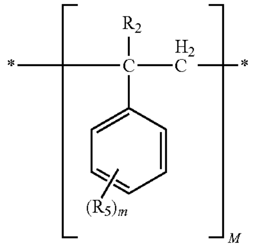

-continued (d)

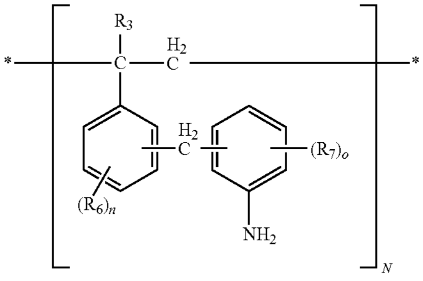

In the above formulae, $R_1$ to $R_7$ represent a hydrogen atom, a hydrocarbon group having 1 to 10 carbon atoms, or a halogenated alkyl group. "l" and "m" each represent a real number of 0 to 5; "n" and "o" represent a real number of 0 to 4. Each of L and M independently represents a real number of 0 to 20, and N represents a real number of 1 to 20. (a), (b), and (d) are bonded to each other by *, and the repeating positions may be random.

The preferred ranges of $R_1$ to $R_7$, "l", "m", "n", "o", L, M, and N in the above formulae (a), (b), and (d) are the same as those of the above formulae (a), (b), and (c).

The average values L, M, and N of the number of repetitions in the formulae (a), (b), (c), and (d) may be calculated from the value of the number average molecular weight (Mn) obtained by GPC measurement of the compound represented by the formulae (a), (b), (c), and (d), the area % of the slice data of each peak (detector: differential refractive index detector), and the like.

The weight average molecular weight (Mw) of the component (B) determined by gel permeation chromatography (GPC) is preferably 200 to less than 5,000, more preferably 500 to less than 4,000, and particularly preferably 1,000 to less than 3,000. The number average molecular weight (Mn) is preferably 200 to less than 5,000, more preferably 500 to less than 3,000, and particularly preferably 1,000 to less than 2,000. When the weight average molecular weight and the number average molecular weight are within the above ranges, purification by water washing is facilitated, and the target compound does not volatilize in the solvent distillation step.

The amine equivalent of component (B) is preferably 100 g/eq. or more to less than 3,000 g/eq., more preferably 200 g/eq. or more to less than 2,000 g/eq., still more preferably 300 g/eq. or more to less than 1,000 g/eq.

Examples of the method for producing the component (B) are described below, but the method is not limited thereto.

First, a styrene monomer having a chloromethyl group and one or more kinds of styrenic monomers are polymerized by radical polymerization, cationic polymerization, anionic polymerization, or the like to obtain a polystyrene compound having a chloromethyl group. Any solvent, a polymerization inhibitor, or a living radical initiator may be added during the polymerization.

Next, the component (B) may be obtained by reacting the obtained polystyrene compound having a chloromethyl group with an aniline-based compound in the presence of an acidic catalyst. In this reaction, any acid catalyst may be used. If necessary, hydrochloric acid, phosphoric acid, sulfuric acid, formic acid, p-toluenesulfonic acid, methanesulfonic acid; Lewis acids such as aluminum chloride and zinc chloride; solid acids such as activated clay, acid clay, white carbon, zeolite, silica alumina; acidic ion exchange resins, and the like may be used. These may be used alone or in combination with two or more. From the viewpoint of simplicity of the manufacturing process and economical efficiency, reusable solid acids (solid acids such as activated clay, acid clay, white carbon, zeolite, and silica alumina; acidic ion exchange resins; and the like) may also be used. The usage amount of the catalyst is generally 0.1 to 0.8 mol based on 1 mol of the aniline-based compound to be used, and preferably 0.2 to 0.7 mol. If the usage amount of the catalyst is too large, the viscosity of the reaction solution may be too high and stirring may be difficult, and if the usage amount is too small, the progress of the reaction may be slow.

When using the reusable solid acid catalyst, the ratio of the amount of the solid acid catalyst used to the amount of the aniline-based compound to be charged is 1 wt % to 50 wt %, preferably 5 wt % to 40 wt %, and more preferably 10 wt % to 30 wt %. When the amount of the solid acid catalyst used is more than the above range, it is difficult to ensure the fluidity of the reaction solution. When the amount of the solid acid catalyst used is less than the above range, the reaction does not proceed sufficiently or the reaction time becomes long.

The reaction may be carried out using an organic solvent such as toluene or xylene if necessary, or may be carried out without a solvent. For example, after adding an acidic catalyst to a mixed solution of an aniline-based compound, a polystyrene compound having a chloromethyl group, and a solvent, if the catalyst contains water, the water is removed from the system by azeotropy. Then, the reaction is carried out at 40° C. to 180° C., preferably 50° C. to 170° C. for 0.5 to 20 hours. Thereafter, while removing water, low molecular weight components, and the like generated in the system by azeotropic distillation, the mixed solution is heated to a temperature of 180° C. to 300° C., preferably 190° C. to 250° C., and more preferably 200° C. to 240° C., and reacted for 5 to 50 hours, and preferably 5 to 20 hours. After completion of the reaction, the acidic catalyst is neutralized with an alkali aqueous solution, and then a non-aqueous organic solvent is added to the oil layer, and washing with water is repeated until the wastewater becomes neutral. When the above-described reusable solid acid catalyst is used, the catalyst is removed by filtration.

The softening point of the component (B) is preferably 80° C. or lower, and more preferably 70° C. or lower. When the softening point is 80° C. or lower, the viscosity of the maleimided resin does not become too high, and the handling becomes easy.

The component (B) may be represented by the following formula (2).

(2)

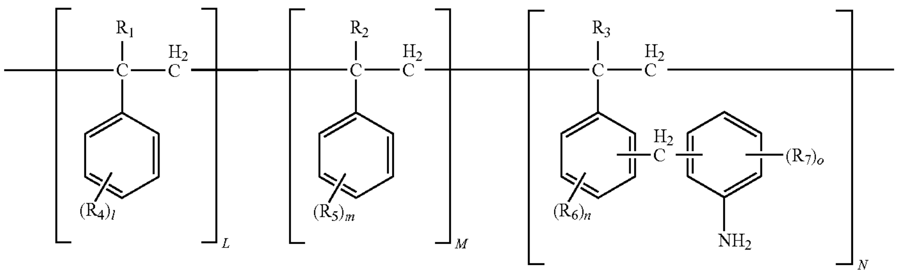

(In formula (2), $R_1$ to $R_7$ represent a hydrogen atom, a hydrocarbon group having 1 to 10 carbon atoms, or a halogenated alkyl group. "1" and "m" each represent a real number of 0 to 5; "n" and "o" represent a real number of 0 to 4. Each of L and M independently represents a real number of 0 to 20, and N represents a real number of 1 to 20. Each repeating unit is shown in a specific order for convenience of description, but each repeating position may be random.)

The component (A) is obtained by reacting the component (B) with maleic acid or maleic anhydride in the presence of a solvent and a catalyst. For example, the maleic acid or maleic anhydride may be reacted with the component (B) using the method described in Japanese Patent No. 6429862. In this case, water generated in the reaction needs to be removed from the inside of the system, so a non-aqueous solvent is used as the solvent used in the reaction. As the solvent to be used, aromatic solvents such as toluene and xylene; aliphatic solvents such as cyclohexane and n-hexane; ethers such as diethyl ether and diisopropyl ether; ester solvents such as ethyl acetate and butyl acetate; and ketone-based solvents such as methyl isobutyl ketone and cyclopentanone may be used, but the solvent is not limited to these solvents and two or more of them may be used in combination. In addition to the water-insoluble solvents, a polar aprotic solvent may also be used in combination. Example thereof include dimethyl sulfone, dimethyl sulfoxide, dimethyl formamide, dimethyl acetamide, 1,3-dimethyl-2-imidazolidinone, N-methylpyrrolidone, and the like, and two or more of them may be used in combination. When using a polar aprotic solvent, it is preferable to use a solvent with a higher boiling point than the water-insoluble solvent used in combination. The catalyst is not particularly limited, and examples thereof include acidic catalysts such as p-toluenesulfonic acid, hydroxy-p-toluenesulfonic acid, methanesulfonic acid, sulfuric acid, and phosphoric acid. For example, maleic acid is dissolved in toluene, and an N-methylpyrrolidone solution other than the component (B) is added under stirring, and then p-toluenesulfonic acid is added thereto, and the reaction is carried out while removing the water generated under the reflux condition from the system.

The softening point of the component (A) is preferably 170° C. or lower, and more preferably 140° C. or lower. When the softening point is 170° C. or lower, heating and melting may be easily performed and handling becomes easy. Although the viscosity may be lowered by using a diluent solvent, it is not preferable because the use is limited to the applications where the solvent can be used.

The component (A) may contain a polymerization inhibitor. Examples of usable polymerization inhibitors include phenolic compounds, sulfur compounds, phosphorus compounds, hindered amine compounds, nitroso compounds, nitroxyl radical compounds, and others. The polymerization inhibitor may be added during the synthesis of the component (A) or after the synthesis. The polymerization inhibitor may be used alone or in combination with two or more kinds. The usage amount of the polymerization inhibitor is generally 0.008 to 1 part by weight, preferably 0.01 to 0.5 parts by weight, based on 100 parts by weight of the resin component. Each of these polymerization inhibitors may be used alone, but two or more kinds thereof may be used in combination. In the present invention, phenol, hindered amine, nitroso, and nitroxyl radical inhibitors are preferred.

Specific examples of the phenol-based polymerization inhibitors include: monophenols such as 2,6-di-t-butyl-p-cresol, butylated hydroxyanisole, 2,6-di-t-butyl-p-ethylphenol, stearyl-β-(3,5-di-t-butyl-4-hydroxyphenyl) propionate, isooctyl-3-(3,5-di-t-butyl-4-hydroxyphenyl) propionate, 2,4-bis-(n-octylthio)-6-(4-hydroxy-3,5-di-t-butylanilino)-1, 3,5-triazine, and 2,4-bis[(octylthio) methyl]-o-cresol; bisphenols such as 2,2'-methylenebis(4-methyl-6-t-butylphenol), 2,2'-methylenebis(4-ethyl-6-t-butylphenol), 4,4'-thiobis(3-methyl-6-t-butylphenol), 4,4'-butylidenebis(3-methyl-6-t-butylphenol), triethylene glycol-bis[3-(3-t-butyl-5-methyl-4-hydroxyphenyl) propionate], 1,6-hexanediol bis [3-(3,5-di-t-butyl-4-hydroxyphenyl) propionate], N,N'-hexamethylenebis(3,5-di-t-butyl-4-hydroxy-hydrocinnamamide), 2,2-thio-diethylene bis[3-(3,5-di-t-butyl-4-hydroxyphenyl) propionate], 3,5-di-t-butyl-4-hydroxybenzylphosphonate-diethyl ester, 3,9-bis[1,1-dimethyl-2-{β-(3-t-butyl-4-hydroxy-5-methylphenyl) propionyloxy} ethyl]-2,4,8,10-tetraoxaspiro[5,5]undecane, and bis(ethyl-3,5-di-t-butyl-4-hydroxybenzyl sulfonate) calcium; and polymeric phenols such as 1,1,3-tris(2-methyl-4-hydroxy-5-t-butylphenyl) butane, 1,3,5-trimethyl-2,4,6-tris (3,5-di-t-butyl-4-hydroxybenzyl) benzene, tetrakis-[methylene-3-(3',5'-di-t-butyl-4'-hydroxyphenyl) propionate] methane, bis[3,3'-bis-(4'-hydroxy-3'-t-butylphenyl) butyric acid] glycol ester, tris-(3,5-di-t-butyl-4-hydroxybenzyl)-isocyanurate, 1,3,5-tris(3',5'-di-t-butyl-4'-hydroxybenzyl)-S-triazine-2,4,6-(1H,3H,5H) trione, and tocopherol.

Specific examples of the sulfur-based polymerization inhibitors include dilauryl-3,3'-thiodipropionate, dimyristyl-3,3'-thiodipropionate, and distearyl-3,3'-thiodipropionate.

Specific examples of the phosphorus-based polymerization inhibitor include: phosphites 30 such as triphenyl phosphite, diphenyl isodecyl phosphite, phenyl diisodecyl phosphite, tris(nonylphenyl) phosphite, diisodecyl pentaerythritol phosphite, tris(2,4-di-t-butylphenyl) phosphite, cyclic neopentanetetraylbis(octadecyl) phosphite, cyclic neopentanetetraylbis(2,4-di-t-butylphenyl) phosphite, cyclic neopentanetetraylbis(2,4-di-t-butyl-4-methylphenyl) phosphite, and bis[2-t-butyl-6-methyl-4-{2-(octadecyloxy-carbonyl) ethyl} phenyl] hydrogen phosphite; and oxaphosphaphenanthrene oxides such as 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide, and 10-decyloxy-9,10-dihydro-9-oxa-10-phosphaphenanthrene-10-oxide.

Specific examples of the hindered amine-based polymerization inhibitors include, but are not limited to, ADK STAB LA-40MP, ADK STAB LA-40Si, ADK STAB LA-402AF, ADK STAB LA-87, ADK STAB LA-82, ADK STAB LA-81, ADK STAB LA-77Y, ADK STAB LA-77G, ADK STAB LA-72, ADK STAB LA-68, ADK STAB LA-63P, ADK STAB LA-57, ADK STAB LA-52, Chimassorb 2020FDL, Chimassorb 944FDL, Chimassorb 944LD, Tinuvin 622SF, Tinuvin PA144, Tinuvin 765, Tinuvin 770DF, Tinuvin XT55FB, Tinuvin 111FDL, Tinuvin 783FDL, and Tinuvin 791FB.

Specific examples of the nitroso-based polymerization inhibitor include p-nitrosophenol, N-nitrosodiphenylamine, ammonium salt of N-nitrosophenylhydroxyamine (cupferron), and preferably an ammonium salt of N-nitrosophenylhydroxyamine (cupferron).

Specific examples of nitroxyl radical-based polymerization inhibitors include, but are not limited to, TEMPO (2,2,6,6-tetramethylpiperidine 1-oxyl) free radicals, and 4-hydroxy-TEMPO free radicals.

The curable resin composition of the present invention may use any known material as a curable resin other than the component (A). Specific examples thereof include a phenolic resin, an epoxy resin, an amine resin, an active alkene-containing resin, an isocyanate resin, a polyamide resin, a polyimide resin, a cyanate ester resin, a propenyl resin, a methallyl resin, and an active ester resin, which may be used in one kind or in combination. In addition, from the viewpoint of the balance of heat resistance, adhesion, and dielectric properties, it is preferable to contain an epoxy resin, an active alkene-containing resin, and a cyanate ester resin. By containing these curable resins, it is possible to improve the brittleness of the cured product and the adhesion to the metal, and it is possible to suppress cracks in the package in the reliability test such as solder reflow and temperature cycling.

The usage amount of the curable resin is preferably 10 times by mass or less, more preferably 5 times by mass or less, and particularly preferably 3 times by mass or less with respect to the component (A). The lower limit is preferably 0.5 times by mass or more, and more preferably 1 time by mass or more. When the amount is 10 times by mass or less, the effect of the heat resistance and the dielectric properties of the component (A) may be utilized.

As the phenolic resin, the epoxy resin, the amine resin, the active alkene-containing resin, the isocyanate resin, the polyamide resin, the polyimide resin, the cyanate ester resin, and the active ester resin, those exemplified below may be used.

Examples of the phenolic resin include: polycondensates of phenols (such as phenol, alkyl-substituted phenols, aromatic-substituted phenols, hydroquinone, resorcin, naphthol, alkyl-substituted naphthol, dihydroxybenzene, alkyl-substituted dihydroxybenzene, dihydroxynaphthalene) and various aldehydes (such as formaldehyde, acetaldehyde, alkylaldehyde, benzaldehyde, alkyl-substituted benzaldehyde, hydroxybenzaldehyde, naphthaldehyde, glutaraldehyde, phthalaldehyde, crotonaldehyde, cinnamaldehyde, furfural); polymers of phenols and various diene compounds (such as dicyclopentadiene, terpenes, vinylcyclohexene, norbornadiene, vinylnorbomene, tetrahydroindene, divinylbenzene, divinylbiphenyl, diisopropenylbiphenyl, butadiene, isoprene); polycondensates of phenols and ketones (such as acetone, methyl ethyl ketone, methyl isobutyl ketone, acetophenone, benzophenone); phenolic resins obtained by polycondensation of phenols and substituted biphenyls (such as 4,4'-bis(chloromethyl)-1,1'-biphenyl, and 4,4'-bis(methoxymethyl)-1,1'-biphenyl) or substituted phenyls (such as 1,4-bis(chloromethyl) benzene, 1,4-bis (methoxymethyl) benzene, and 1,4-bis(hydroxymethyl) benzene); polycondensates of bisphenols and various aldehydes; and polyphenylene ether.

Examples of the epoxy resin include: glycidyl ether-based epoxy resin obtained by glycidylating the phenolic resins, alcohols, and the like; alicyclic epoxy resin such as 4-vinyl-1-cyclohexene diepoxide, 3,4-epoxycyclohexylmethyl-3,4'-epoxycyclohexanecarboxylate; glycidyl amine-based epoxy resin such as tetraglycidyl diaminodiphenylmethane (TGDDM); and glycidyl ester-based epoxy resin such as triglycidyl-p-aminophenol.

Examples of amine resin include: aniline resin obtained by a reaction of diaminodiphenylmethane, diaminodiphenylsulfone, isophoronediamine, naphthalenediamine, aniline novolac, orthoethylaniline novolac, or aniline, with xylene chloride; aniline, substituted biphenyls (such as 4,4'-bis(chloromethyl)-1,1'-biphenyl, and 4,4'-bis (methoxymethyl)-1,1'-biphenyl), or substituted phenyls (such as 1,4-bis(chloromethyl)benzene, 1,4-bis(methoxymethyl)benzene, and 1,4-bis(hydroxymethyl)benzene) described in Japanese Patent No. 6429862.

Examples of active alkene-containing resin include: polycondensates of the phenolic resin and active alkene-containing halogen-based compounds (such as chloromethylstyrene, allyl chloride, acrylic chloride, allyl chloride); polycondensates of active alkene-containing phenols (such as 2-allylphenol, 2-propenylphenol, 4-allylphenol, 4-propenylphenol, eugenol, and isoeugenol) and halogen-based compounds (such as 4,4'-bis(methoxymethyl)-1,1'-biphenyl, 1,4-bis(chloromethyl)benzene, 4,4'-difluorobenzophenone, 4,4'-dichlorobenzophenone, 4,4'-dibromobenzophenone, cyanuric chloride); polycondensates of epoxy resins or alcohols substituted or unsubstituted acrylates (such as acrylate or methacrylate); maleimide resins (4,4'-diphenylmethane bismaleimide, polyphenylmethanemaleimide, m-phenylene bismaleimide, 2,2'-bis[4-(4-maleimidophenoxy)phenyl]propane, 3,3'-dimethyl-5,5'-diethyl-4,4'-diphenylmethane bismaleimide, 4-methyl-1,3-phenylene bismaleimide, 4,4'-diphenyletherbismaleimide, 4,4'-diphenyl sulfone bismaleimide, 1,3-bis(3-maleimidophenoxy)benzene, 1,3-bis(4-maleimidophenoxy)benzene).

Examples of the isocyanate resin include: aromatic diisocyanates such as p-phenylene diisocyanate, m-phenylene diisocyanate, p-xylene diisocyanate, m-xylene diisocyanate, 2,4-tolylene diisocyanate, 2,6-tolylene diisocyanate, 4,4'-diphenylmethane diisocyanate, and naphthalene diisocyanate; aliphatic or alicyclic diisocyanates such as isophorone diisocyanate, hexamethylene diisocyanate, 4,4'-dicyclohexylmethane diisocyanate, hydrogenated xylene 25 diisocyanate, norbornene diisocyanate, and lysine diisocyanate; polyisocyanates such as biuret compounds of one or more kinds of isocyanate monomers or isocyanate compounds obtained by trimerization of the diisocyanate compounds; and polyisocyanates obtained by a urethanation reaction between the isocyanate compound and a polyol compound.

Examples of polyamide resin include: a polymer obtained by mainly using one or more selected from amino acids (such as 6-aminocaproic acid, 11-aminoundecanoic acid, 12-aminododecanoic acid, paraaminomethylbenzoic acid), lactams (ε-caprolactam, ω-undecanelactam, ω-laurolactam); or a polymer obtained by mainly using one or more diamines and one or more dicarboxylic acids.

Examples of diamine include: aliphatic diamines such as ethylenediamine, trimethylenediamine, tetramethylenediamine, pentamethylenediamine, hexamethylenediamine, heptamethylenediamine, octamethylenediamine, nonamethylenediamine, decanediamine, undecanediamine, dodecanediamine, tridecanediamine, tetradecanediamine, pentadecanediamine, hexadecanediamine, heptadecanediamine, octadecanediamine, nonadecanediamine, eicosanediamine, 2-methyl-1,5-diaminopentane, 2-methyl-1,8-diaminooctane; cycloaliphatic diamines such as cyclohexanediamine, bis-(4-aminocyclohexyl)methane, bis(3-methyl-4-aminocyclohexyl)methane; aromatic diamines such as xylylene diamine.

Examples of dicarboxylic acids include: aliphatic dicarboxylic acids such as oxalic acid, malonic acid, succinic acid, glutaric acid, adipic acid, suberic acid, azelaic acid, sebacic acid, undecanedioic acid and dodecanedioic acid; aromatic dicarboxylic acids such as terephthalic acid, isophthalic acid, 2-chloroterephthalic acid, 2-methylterephthalic acid, 5-methylisophthalic acid, 5-sodium sulfoisophthalic acid, hexahydroterephthalic acid, and hexahydroisophthalic acid; alicyclic dicarboxylic acids such as cyclohexanedicarboxylic acid; dialkyl esters of these dicarboxylic acids; and dichlorides.

Polyimide resin is a polycondensate of the above diamine and tetracarboxylic dianhydride.

Examples of the tetracarboxylic dianhydride include: 4,4'-(hexafluoroisopropylidene) diphthalic anhydride, 5-(2,5-dioxotetrahydro-3-furanyl)-3-methyl-cyclohexene-1,2-dicarboxylic anhydride, pyromellitic dianhydride, 1,2,3,4-benzenetetracarboxylic dianhydride, 3,3',4,4'-benzophenonetetracarboxylic dianhydride, 2,2',3,3'-benzophenonetetracarboxylic dianhydride, 3,3',4,4'-biphenyltetracarboxylic dianhydride, 3,3',4,4'-diphenylsulfonetetracarboxylic dianhydride, 2,2',3,3'-biphenyltetracarboxylic dianhydride, methylene-4,4'-diphthalic dianhydride, 1,1-ethylidene-4,4'-diphthalic dianhydride, 2,2'-propylidene-4,4'-diphthalic dianhydride, 1,2-ethylene-4,4'-diphthalic dianhydride, 1,3-trimethylene-4,4'-diphthalic dianhydride, 1,4-tetramethylene-4,4'-diphthalic dianhydride, 1,5-pentamethylene-4,4'-diphthalic dianhydride, 4,4'-oxydiphthalic dianhydride, thio-4,4'-diphthalic dianhydride, sulfonyl-4,4'-diphthalic dianhydride, 1,3-bis(3,4-dicarboxyphenyl) benzene dianhydride, 1,3-bis(3,4-dicarboxyphenoxy) benzene dianhydride, 1,4-bis(3,4-dicarboxyphenoxy) benzene dianhydride, 1,3-bis[2-(3,4-dicarboxyphenyl)-2-propyl] benzene dianhydride, 1,4-bis[2-(3,4-dicarboxyphenyl)-2-propyl] benzene dianhydride, bis[3-(3,4-dicarboxyphenoxy) phenyl] methane dianhydride, bis[4-(3,4-dicarboxyphenoxy) phenyl]methane dianhydride, 2,2-bis[3-(3,4-dicarboxyphenoxy) phenyl] propane dianhydride, 2,2-bis[4-(3,4-dicarboxyphenoxy) phenyl] propane dianhydride, bis(3,4-dicarboxyphenoxy) dimethylsilane dianhydride, 1,3-bis(3,4-dicarboxyphenyl)-1,1,3,3-tetramethyldisiloxane dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9,10-perylenetetracarboxylic dianhydride, 2,3,6,7-anthracene tetracarboxylic dianhydride, 1,2,7,8-phenanthrenetetracarboxylic dianhydride, ethylenetetracarboxylic dianhydride, 1,2,3,4-butanetetracarboxylic dianhydride, 1,2,3,4-cyclobutanetetracarboxylic dianhydride, cyclopentanetetracarboxylic dianhydride, cyclohexane-1,2,3,4-tetracarboxylic dianhydride, cyclohexane-1,2,4,5-tetracarboxylic dianhydride, 3,3',4,4'-bicyclohexyltetracarboxylic dianhydride, carbonyl-4,4'-bis(cyclohexane-1,2-dicarboxylic acid) dianhydride, methylene-4,4'-bis(cyclohexane-1,2-dicarboxylic acid) dianhydride, 1,2-ethylene-4,4'-bis(cyclohexane-1,2-dicarboxylic acid) dianhydride, 1,1-ethylidene-4,4'-bis(cyclohexane-1,2-dicarboxylic acid) dianhydride, 2,2-propylidene-4,4'-bis(cyclohexane-1,2-dicarboxylic acid) dianhydride, oxy-4,4'-bis(cyclohexane-1,2-dicarboxylic acid) dianhydride, thio-4,4'-bis (cyclohexane-1,2-dicarboxylic acid) dianhydride, sulfonyl-4,4'-bis(cyclohexane-1,2-dicarboxylic acid) dianhydride, bicyclo[2,2,2] oct-7-ene-2,3,5,6-tetracarboxylic dianhydride, rel-[1S,5R,6R]-3-oxabicyclo[3,2,1] octane-2,4-dione-6-spiro-3'-(tetrahydrofuran-2',5'-dione), 4-(2,5-dioxotetrahydrofuran-3-yl)-1,2,3,4-tetrahydronaphthalene-1,2-dicarboxylic anhydride, ethylene glycol-bis-(3,4-dicarboxylic anhydride phenyl) ether, 4,4'-biphenylbis (trimellitic acid monoesteric anhydride), and 9,9'-bis(3,4-dicarboxyphenyl) fluorene dianhydride).

Cyanate ester resin is a cyanate ester compound obtained by allowing a phenolic resin to react with cyan halide. Specific examples thereof include, but are not limited to: dicyanato benzene, tricyanato benzene, dicyanato naphthalene, dicyanato biphenyl, 2,2'-bis(4-cyanatophenyl) propane, bis(4-cyanatophenyl) methane, bis(3,5-dimethyl-4-cyanatophenyl) methane, 2,2'-bis(3,5-dimethyl-4-cyanatophenyl) propane, 2,2'-bis(4-cyanato phenyl) ethane, 2,2'-bis(4-cyanato phenyl) hexafluoropropane, bis(4-cyanatophenyl) sulfone, bis(4-cyanatophenyl) thioether, phenol novolac cyanate, and phenol-dicyclopentadiene co-condensate with hydroxy group converted to cyanate group, but these are not limited thereto.

In addition, cyanate ester compounds whose synthesis methods are described in JP-A-2005-264154 are particularly preferable as cyanate ester compounds because they are excellent in low hygroscopicity, flame retardancy, and dielectric properties.

If necessary, the cyanate ester resin may contain catalyst such as zinc naphthenate, cobalt naphthenate, copper naphthenate, lead naphthenate, zinc octylate, tin octylate, lead acetylacetonate, or dibutyltin maleate in order to optionally trimerize the cyanate groups to form a sym-triazine ring. The catalyst is generally used in an amount of 0.0001 to 0.10 parts by mass, preferably 0.00015 to 0.0015 parts by mass, based on the total mass (100 parts by mass) of the curable resin composition.

As to the active ester resin, a compound having one or more active ester groups in one molecule, such as an epoxy resin, may be used as a curing agent for a curable resin other than the component (A), if necessary. The active ester-based curing agent is preferably a compound having two or more ester groups having high reaction activity in one molecule, such as phenol esters, thiophenol esters, N-hydroxyamine esters, and esters of heterocyclic hydroxy compounds. The active ester-based curing agent is preferably obtained by a condensation reaction of at least one of a carboxylic acid compound and a thiocarboxylic acid compound with at least one of a hydroxy compound and a thiol compound. In particular, from the viewpoint of improving heat resistance, an active ester-based curing agent obtained from a carboxylic acid compound and a hydroxy compound is preferred, and an active ester-based curing agent obtained from a carboxylic acid compound and at least one of a phenol compound and a naphthol compound is preferred.

Examples of the carboxylic acid compound include benzoic acid, acetic acid, succinic acid, maleic acid, itaconic acid, phthalic acid, isophthalic acid, terephthalic acid, and pyromellitic acid.

Examples of the phenol compound or the naphthol compound include hydroquinone, resorcinol, bisphenol A, bisphenol F, bisphenol S, phenolphthalin, methylated bisphenol A, methylated bisphenol F, methylated bisphenol S, phenol, o-cresol, m-cresol, p-cresol, catechol, α-naphthol, β-naphthol, 1,5-dihydroxynaphthalene, 1,6-dihydroxynaphthalene, 2,6-dihydroxynaphthalene, dihydroxybenzophenone, trihydroxybenzophenone, tetrahydroxybenzophenone, phloroglucin, benzenetriol, dicyclopentadiene type diphenol compounds, and phenol novolac. Here, the "dicyclopentadiene type diphenol compound" refers to a diphenol compound obtained by condensing one molecule of dicyclopentadiene molecule with two molecules of phenol.

Preferred specific examples of the active ester-based curing agent include an active ester compound containing a dicyclopentadiene type diphenol structure, an active ester compound containing a naphthalene structure, an active ester compound containing an acetylated phenol novolac, and an active ester compound containing a benzoylated phenol novolac. Among them, the active ester compound containing a naphthalene structure and the active ester compound containing a dicyclopentadiene type diphenol structure are more preferred. The "dicyclopentadiene type diphenol structure" represents a divalent structural unit composed of phenylene-dicyclopentylene-phenylene.

Examples of commercially available products of the active ester-based curing agent include: "EXB9451", "EXB9460", "EXB9460S", "HPC-8000-65T", "HPC-8000H-65TM", "EXB-8000L-65T1", and "EXB-8150-65T" (manufactured by DIC Corporation) as active ester compounds containing a dicyclopentadiene type diphenol structure; "EXB9416-70BK" (manufactured by DIC Corporation) as an active ester compound containing a naphthalene structure; "DC808" (manufactured by Mitsubishi Chemical Corporation) as an active ester compound containing an acetylated phenol novolac; "YLH1026", "YLH1030", and "YLH1048" (manufactured by Mitsubishi Chemical Corporation) as active ester compounds containing a benzoylated phenol novolac; "DC808" (manufactured by Mitsubishi Chemical Corporation) as an active ester-based curing agent containing an acetylated phenol novolac; and "EXB-9050L-62M" (manufactured by DIC Corporation) as an active ester-based curing agent containing a phosphorus atom.

The curable resin composition of the present invention may also improve the curability by being used in combination with a curing accelerator (curing catalyst). As a specific example of the curing accelerator that may be used, it is preferable to use a radical polymerization initiator for the purpose of promoting self-polymerization of a radically polymerizable curable resin such as an olefin compound or a maleimide resin, or radical polymerization with other components. Examples of the radical polymerization initiators that may be used include, but are not limited to, known curing accelerators such as: ketone peroxides such as methyl ethyl ketone peroxide and acetylacetone peroxide; diacyl peroxides such as benzoyl peroxide; dialkyl peroxides such as dicumyl peroxide and 1,3-bis(t-butylperoxyisopropyl)-benzene; peroxyketals such as t-butylperoxybenzoate and 1,1-di-t-butylperoxycyclohexane; alkyl peresters such as α-cumylperoxyneodecanoate, t-butylperoxyneodecanoate, t-butylperoxypivalate, 1,1,3,3-tetramethylbutylperoxy-2-ethylhexanoate, t-amylperoxy-2-ethylhexanoate, t-butylperoxy-2-ethylhexanoate, t-amylperoxy-3,5,5-trimethylhexanoate, t-butylperoxy-3,5,5-trimethylhexanoate, and t-amylperoxybenzoate; peroxycarbonates such as di-2-ethylhexyl peroxydicarbonate, bis(4-t-butylcyclohexyl) peroxydicarbonate, t-butylperoxyisopropyl carbonate, and 1,6-bis(t-butylperoxycarbonyloxy) hexane; organic peroxides such as t-butyl hydroperoxide, cumene hydroperoxide, t-butylperoxyoctoate, and lauroyl peroxide; and azo compounds such as azobisisobutyronitrile, 4,4'-azobis(4-cyanovaleric acid), and 2,2'-azobis(2,4-dimethylvaleronitrile). The ketone peroxides, diacyl peroxides, hydroperoxides, dialkyl peroxides, peroxyketals, alkyl peresters, and percarbonates are preferred, and the dialkyl peroxides are more preferred. The amount of the radical polymerization initiator to be added is preferably 0.01 to 5 parts by mass, and particularly preferably 0.01 to 3 parts by mass, based on 100 parts by mass of the curable resin composition. When the amount of the radical polymerization initiator used is large, the molecules do not extend to have enough molecular weight during the polymerization reaction.

As necessary, a curing accelerator other than the radical polymerization initiator may be added to the curable resin composition of the present invention. The curing accelerator may be added in combination with the radical polymerization initiator. Specific examples of the curing accelerator that may be used include: imidazoles such as 2-methylimidazole, 2-ethylimidazole, and 2-ethyl-4-methylimidazole; tertiary amines such as 2-(dimethylaminomethyl) phenol and 1,8-diaza-bicyclo(5,4,0)undecene-7; phosphines such as triphenylphosphine; and transition metal compounds (transition metal salts) such as: quaternary ammonium salts such as tetrabutylammonium salt, triisopropylmethylammonium salt, trimethyldecanylammonium salt, cetyltrimethylammonium salt, and hexadecyltrimethylammonium hydroxide; quaternary phosphonium salts such as triphenylbenzylphosphonium salt, triphenylethylphosphonium salt, and tetrabutylphosphonium salt (the counter ions of the quatemary salts are not particularly specified, and examples thereof include halogen, organic acid ions, and hydroxide ions in which organic acid ions and hydroxide ions are particularly preferred); tin octylates; and zinc compounds such as zinc carboxylates (zinc 2-ethylhexanate, zinc stearate, zinc behenate, zinc myrisate), and zinc phosphate esters (zinc octyl phosphate, zinc stearyl phosphate, or the like). The blending amount of the curing accelerator is 0.01 to 5.0 parts by weight based on 100 parts by weight of the epoxy resin.

The curable resin composition of the present invention may contain a phosphorus-containing compound as ingredients that impart flame retardancy. The phosphorus-containing compound may be a reactive compound or an additive compound. Specific examples of the phosphorus-containing compound include: phosphate esters such as trimethyl phosphate, triethyl phosphate, tricresyl phosphate, trixylylenyl phosphate, cresyl diphenyl phosphate, cresyl-2,6-dixylylenyl phosphate, 1,3-phenylenebis(dixylylenyl phosphate), 1,4-phenylene bis(dixylylenyl phosphate), and 4,4'-biphenyl (dixylylenyl phosphate); phosphanes such as 9,10-dihydro-9-oxa-10-phosphaphenanthrene-10-oxide and 10-(2,5-dihydroxyphenyl)-10H-9-oxa-10-phosphaphenanthrene-10-oxide; phosphorus-containing epoxy compounds obtained by reacting an epoxy resin with active hydrogens of the phosphanes; and red phosphorus.

The phosphate esters, the phosphanes, and the phosphorus-containing epoxy compounds are preferred, and 1,3-phenylenebis(dixylylenyl phosphate), 1,4-phenylene bis (dixylylenyl phosphate), 4,4'-biphenyl (dixylylenyl phosphate), or the phosphorus-containing epoxy compounds are particularly preferred. The content of the phosphorus-containing compound to total epoxy resin, (phosphorus-containing compound)/(total epoxy resin) is preferably within a range of 0.1 to 0.6 (weight ratio). If the weight ratio is less than 0.1, the flame retardancy is insufficient, and if the weight ratio more than 0.6, there is a concern that the hygroscopicity and dielectric properties of the cured product may be adversely affected.

A light stabilizer may be added to the curable resin composition of the present invention if necessary. The light stabilizer is preferably Hindered Amine Light Stabilizers (HALS) or the like. HALS is not particularly limited, and typical examples thereof include: a polycondensate of dibutylamine/1,3,5-triazine/N,N'-bis(2,2,6,6-tetramethyl-4-piperidyl)-1,6-hexamethylenediamine/N-(2,2,6,6-tetramethyl-4-piperidyl) butylamine; a polycondensate of dimethyl succinate-1-(2-hydroxyethyl)-4-hydroxy-2,2,6,6-tetramethylpiperidine; poly[{6-(1,1,3,3-tetramethylbutyl) amino-1,3,5-triazine-2,4-diyl} {(2,2,6,6-tetramethyl-4-piperidyl) imino} hexamethylene {(2,2,6,6-tetramethyl-4-piperidyl) imino}]; bis(1,2,2,6,6-pentamethyl-4-piperidyl)[[3,5-bis(1,1-dimethylethyl)-4-hydroxyphenyl] methyl] butyl malonate; bis(2,2,6,6-tetramethyl-4-piperidyl) sebacate; bis(1,2,2,6,6-pentamethyl-4-piperidyl) sebacate; bis(1-octyloxy-2,2,6,6-tetramethyl-4-piperidyl) sebacate; and 2-(3,5-di-t-butyl-4-hydroxybenzyl)-2-n-butylmalonate bis(1,2,2,6,6-pentamethyl-4-piperidyl). Only one kind of HALS may be used, or two or more kinds thereof may be used in combination.

the curable resin composition of the present invention may be blended with a binder resin as necessary. Examples of the binder resin include, but are not limited to: butyral resin, acetal resin, acrylic resin, epoxy-nylon resin, NBR (nitrile butadiene rubber)-phenolic resin, epoxy-NBR resin, polyamide resin, polyimide resin, and silicone-based resin. The blending amount of the binder resin is preferably in a range that does not impair the flame retardancy and heat resistance of the cured product, and is preferably 0.05 to 50 parts by mass, and more preferably 0.05 to 20 parts by mass based on 100 parts by mass of the resin component.

Inorganic fillers may be added to the curable resin composition of the present invention if necessary. Examples of the inorganic fillers include powders, spherical fillers, or crushed fillers of: fused silica, crystalline silica, porous silica, alumina, zircon, calcium silicate, calcium carbonate, quartz powder, silicon carbide, silicon nitride, boron nitride, zirconia, aluminum nitride, graphite, forsterite, steatite, spinel, mullite, titania, talc, clay, iron oxide asbestos, and glass powder. In particular, when a curable resin composition for encapsulating a semiconductor is obtained, the amount of the inorganic filler used is generally within a range of 80 to 92 mass %, preferably 83 to 90 mass % in the curable resin composition.

In addition, known additives may be blended into the curable resin composition of the present invention, if necessary. Specific examples of additives that may be used include: surface treatment agents of fillers such as polybutadiene, modified polybutadiene, modified acrylonitrile copolymers, polyphenylene ether, polystyrene, polyethylene, polyimide, fluororesins, silicone gel, silicone oil, and silane coupling agents; release agents; and colorants such as carbon black, phthalocyanine blue, and phthalocyanine green. The blending amount of these additives is preferably 1,000 parts by mass or less, and more preferably 700 parts by mass or less based on 100 parts by mass of the curable resin composition.

The curable resin composition of the present invention is obtained by uniformly mixing the above components at a predetermined ratio. The curable resin composition is preliminary cured in a range of 130° C. to 180° C. for 30 seconds to 500 seconds, and post-cured at 150° C. to 200° C. for 2 hours to 15 hours to proceed a sufficient curing reaction, thereby a cured product of the present invention is obtained. Alternatively, the components of the curable resin composition may be uniformly dispersed or dissolved in a solvent or the like, and then removed of the solvent and cured.

The thus-obtained curable resin composition of the present invention has moisture resistance, heat resistance, and high adhesiveness. Therefore, the curable resin composition of the present invention may be used in a wide range of fields requiring moisture resistance, heat resistance, and high adhesiveness. Specifically, the present invention is useful as various materials for electric and electronic components such as insulating materials, laminated boards (printed wiring boards, BGA substrates, build-up substrates, and the like), sealing materials, and resists. In addition to molding materials and composite materials, the present invention may also be used in fields such as coating material, adhesive, and 3D printing. In particular, the solder reflow resistance is beneficial in semiconductor sealing.

Some semiconductor devices are sealed with the curable resin composition of the present invention. Examples of the semiconductor device include a DIP (dual in-line package), a QFP (quad flat package), a BGA (ball grid array), a CSP (chip-size package), an SOP (small outline package), a TSOP (thin small outline package), and a TQFP (thin quad flat package).

The method for preparing the curable resin composition of the present invention is not particularly limited. The respective components may be mixed uniformly or prepolymerized. For example, the curable resin of the present invention is prepolymerized by being heated in the presence or absence of a catalyst or in the presence or absence of a solvent. Similarly, in addition to the curable resin of the present invention, a curing agent such as an epoxy resin, an amine compound, a maleimide-based compound, a cyanate ester compound, a phenolic resin, and an acid anhydride compound, and other additives may be added to prepolymerize the resin. For example, an extruder, a kneader, a roll, or the like is used in the absence of a solvent, and a reaction vessel equipped with a stirring device or the like is used in the presence of a solvent, for mixing the components or forming the prepolymer.

A method of uniformly mixing includes kneading and mixing the components at a temperature within a range of 50 to 100° C. using an apparatus such as a kneader, a roll, or a planetary mixer to obtain a uniform resin composition. The obtained resin composition is pulverized and then molded into a cylindrical tablet by a molding machine such as a tablet machine, or into a granular powder or powdery molded body. These compositions may be melted on a surface support and molded into a sheet shape having a thickness of 0.05 mm to 10 mm. Thereby a curable resin composition molded body is obtained. The obtained molded body has no stickiness at 0° C. to 20° C., and the fluidity and the curability hardly lower even after being stored at—−25° C. to 0° C. for one week or more.

The obtained molded body may be molded into a cured product by a transfer molding machine or a compression molding machine.

A varnish-like composition (hereinafter, simply referred to as varnish) may be obtained by adding an organic solvent to the curable resin composition of the present invention. As necessary, the curable resin composition of the present invention is dissolved in a solvent such as toluene, xylene, acetone, methyl ethyl ketone, methyl isobutyl ketone, dimethylformamide, dimethylacetamide or N-methylpyrrolidone to form a varnish, and a base material such as glass fiber, carbon fiber, polyester fiber, polyamide fiber, alumina fiber, paper or the like is impregnated with the varnish, which is then heated and dried to obtain a prepreg. By subjecting the prepreg to hot press forming, it is possible to obtain a cured product of the curable resin composition of the present invention. The amount of the solvent used at this time is usually 10% to 70% by weight, preferably 15% to 70% by weight in the mixture of the curable resin composition of the present invention and the solvent. In addition, if the composition is liquid, a curable resin-cured product containing carbon fibers may be obtained by, for example, an RTM(Resin Transfer Molding) method.

The curable resin composition of the present invention may also be used as a modifier for a film-type composition. Specifically, the curable composition may be used to improve flexibility or the like in the B-stage. Such a film-type resin composition is obtained as a sheet-shaped adhesive by applying the curable resin composition of the present invention as the curable resin composition varnish onto a release film, removing the solvent under heating, and then performing B-stage formation. This sheet-shaped adhesive may be used as an interlayer insulating layer in a multilayer substrate or the like.

A prepreg may be obtained by heating and melting the curable resin composition of the present invention, reducing the viscosity of the composition, and impregnating reinforcing fibers such as glass fibers, carbon fibers, polyester fibers, polyamide fibers, and alumina fibers with the composition. Specific examples thereof include, but are not particularly limited to, glass fibers such as E glass cloth, D glass cloth, S glass cloth, Q glass cloth, spherical glass cloth, NE glass cloth, and T glass cloth; inorganic fibers other than glass; organic fibers such as polyparaphenylene terephthalamide (Kevlar (registered trademark), manufactured by DuPont), all aromatic polyamide, and polyesters, polyparaphenylene benzoxazole, and polyimide; and carbon fibers. The shape of the substrate is not particularly limited, and examples of the substrate include a woven fabric, a nonwoven fabric, roving, and a chopped strand mat. In addition, as a weaving method of the woven fabric, plain weave, basketweave, twill weave, and the like are known, and these known weaving methods may be appropriately selected and used depending on the intended use and performance. In addition, a woven fabric that has been subjected to an opening treatment or a glass woven fabric that has been subjected to a surface treatment with a silane coupling agent or the like is preferably used. The thickness of the substrate is not particularly limited, and is preferably about 0.01 to 0.4 mm. The above prepreg may also be obtained by impregnating reinforcing fibers with the varnish and performing heating and drying.

The laminated board of the present embodiment includes one or more of the prepregs. The laminated board is not particularly limited as long as it includes one or more prepregs, and may include any other layer. A method for manufacturing the laminated board is not particularly limited, and a generally known method may be appropriately applied. For example, a multistage pressing machine, a multistage vacuum pressing machine, a continuous molding machine, an autoclave molding machine, or the like may be used at the time of molding a metal foil-clad laminate. The laminated board may be obtained by laminating the prepregs and molding them under heat and pressure. At this time, the heating temperature is not particularly limited, and is preferably 65 to 300° C., and more preferably 120 to 270° C. The pressure to be applied is not particularly limited, and is preferably 2.0 to 5.0 MPa, and more preferably 2.5 to 4.0 MPa since if the pressure is too high, it is difficult to adjust the solid content of the resin of the laminated board and the quality is not stable, and if the pressure is too low, the air bubbles occur and the adhesion between the laminates deteriorates. The laminated board of the present embodiment may be suitably used as a metal foil-clad laminated board to be described later by including a layer made of a metal foil.

The prepreg is cut into a desired shape and laminated with a copper foil or the like as necessary, and then the curable resin composition is heated and cured while applying pressure to the laminate by a press molding method, an autoclave molding method, a sheet winding molding method, or the like, so that a laminated board for an electric and electronic device (printed wiring board) or a carbon fiber reinforced material may be obtained.

The cured product of the present invention may be used in various applications such as a molding material, an adhesive, a composite material, and a coating material. Since the cured product of the curable resin composition according to the present invention exhibits excellent heat resistance and dielectric properties, it is suitably used for an electrical and electronic component such as a sealing material for a semiconductor element, a sealing material for a liquid crystal display element, a sealing material for an organic EL device, a printed wiring substrate or a build-up laminated board, or a composite material for a lightweight high-strength structural material such as a carbon fiber reinforced plastic or a glass fiber reinforced plastic.

EXAMPLES

Next, the present invention will be described in more detail with reference to Examples. Hereinafter, "part(s)" refers to "part(s) by mass" unless otherwise specified. The present invention is not limited to these Examples.

Various analysis methods used in Examples are described below.

<Weight average molecular weight (Mw), and Number Average Molecular Weight (Mn)>

The Mw and Mn were calculated in terms of polystyrene using a polystyrene standard solution.

GPC: DGU-20A3R, LC-20AD, SIL-20AHT, RID-20A, SPD-20A, CTO-20A, CBM-20A (all manufactured by Shimadzu Corporation)

Column: Shodex KF-603, KF-602×2, KF-601×2

Eluent: tetrahydrofuran

Flow rate: 0.5 ml/min.

Column temperature: 40° C.

Detection: RI (differential refractometer)

<Amine Equivalent>

Amine equivalent was measured according to the method described in JIS K-7236 Annex A.

Synthesis Example 1

Figure 2:
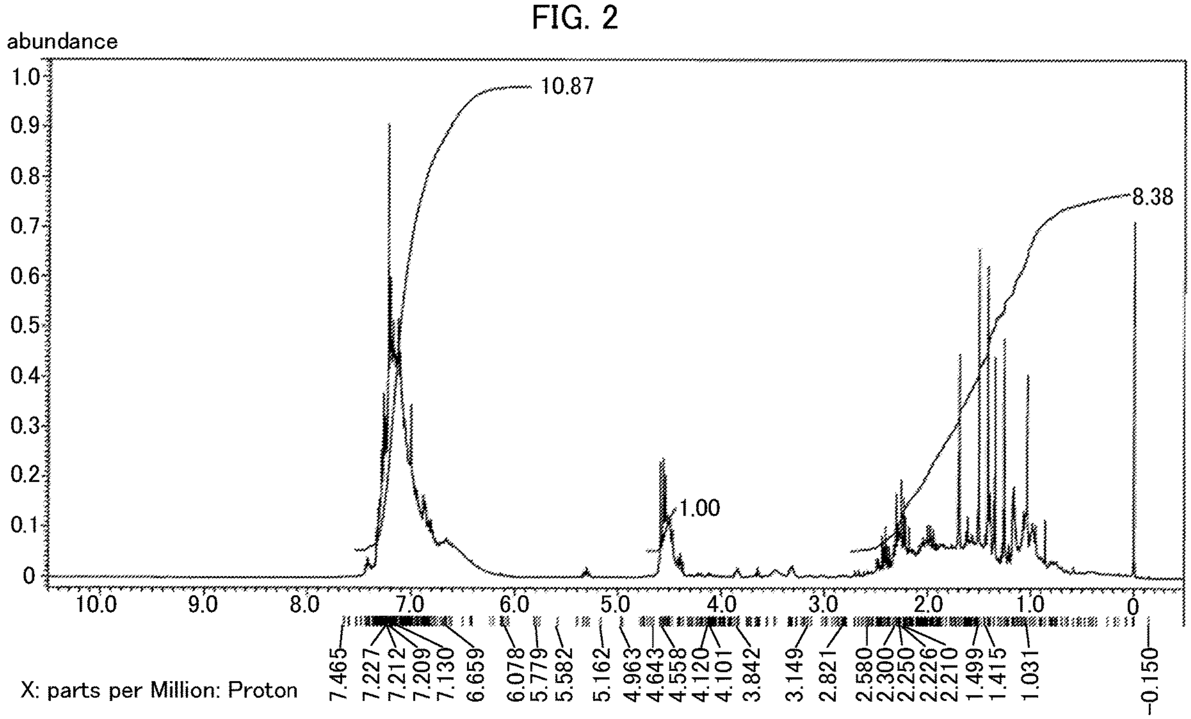
FIG. 2 shows a $^1$H-NMR chart of Synthesis Example 1.

25 parts of toluene and 1.3 parts of boron trifluoride-diethyl ether complex were added to a flask equipped with a thermometer, a condenser, a stirrer, and a dropping funnel, and then nitrogen flow and stirring were started. Using a dropping funnel, a styrene-based compound mixture solution was dropped over 2 hours so that the internal temperature did not exceed 28° C. The mixture contains: 23.7 parts of styrene (manufactured by Tokyo Chemical Industry Co., Ltd.); 26.9 parts of α-methylstyrene (manufactured by Tokyo Chemical Industry Co., Ltd.); and 24.4 parts of chloromethylstyrene (CMS-14, manufactured by AGC Corporation). After continuing the reaction at 25° C. for 2 hours, water was added to stop the reaction, 170 parts of toluene was added, and the mixture was washed with water until the waste water became neutral. The solvent was distilled off from the obtained organic layer under heating and reduced pressure to obtain 62 parts of a polystyrene compound (St-1) having a chloromethyl group as a semi-solid resin (Mn: 684, Mw: 1051). The GPC chart of the obtained compound is shown in FIG. 1. A $^1$H-NMR chart ($CDCl_3$) of the obtained compound is shown in FIG. 2. A signal derived from the chloromethyl group was observed at 4.45 to 4.75 ppm in the $^1$H-NMR chart.

Example 1

Figure 3:
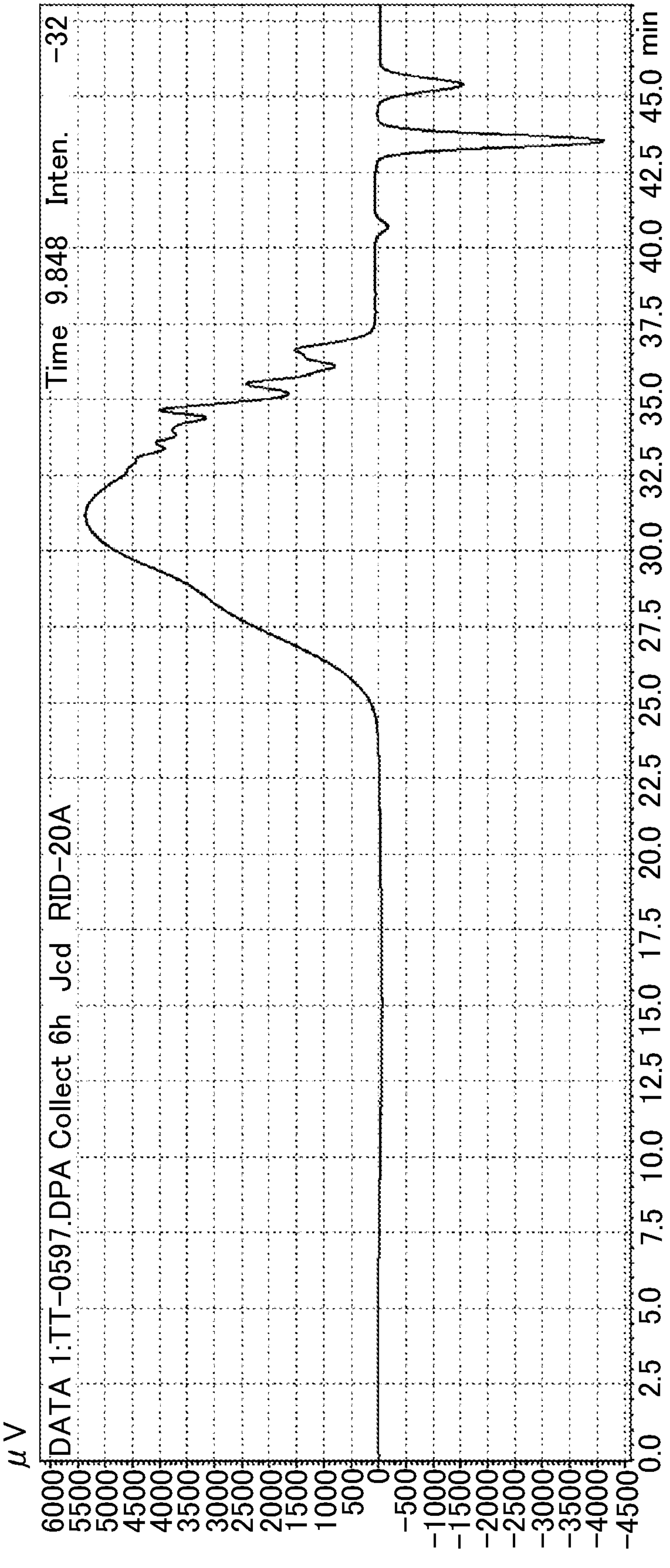
FIG. 3 shows a GPC chart of Example 1.
Figure 4:
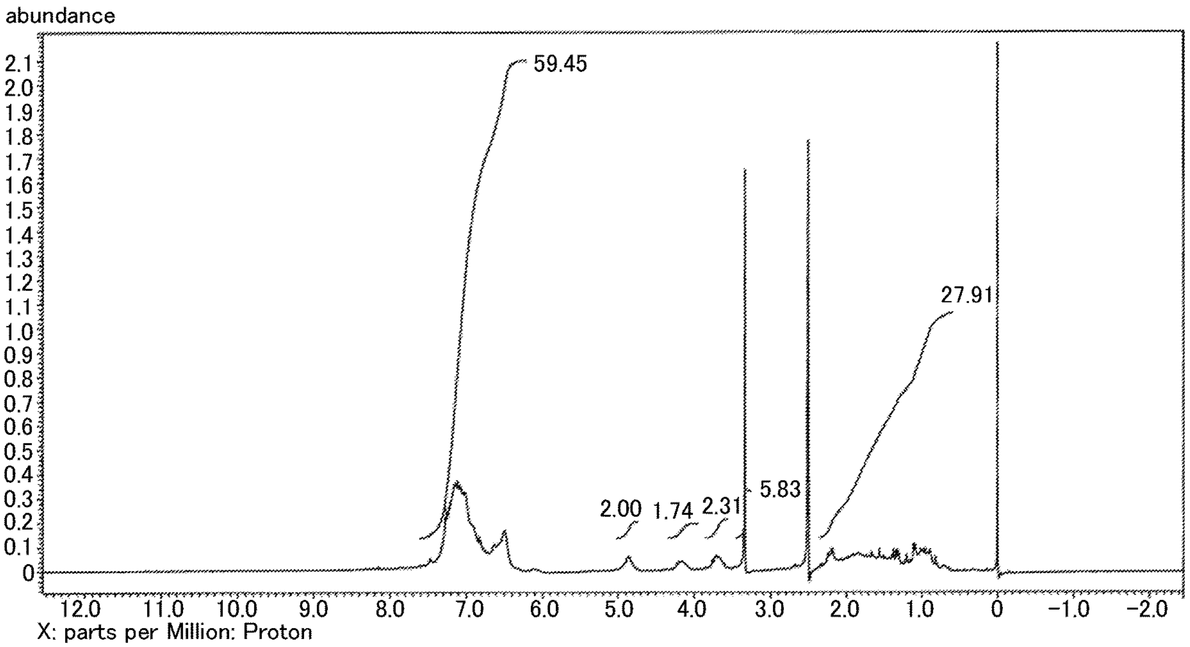
FIG. 4 shows a $^1$H-NMR chart of Example 1.

25 parts of St-1 obtained in Synthesis Example 1; 25 parts of toluene; and 100 parts of aniline were added to a flask equipped with a thermometer, a Dean Stark azeotropic distillation trap, a condenser, a stirrer, and a dropping funnel, and the mixture was reacted at 65° C. for 2 hours. Using a dropping funnel, 27.9 parts of 35% hydrochloric acid was dropped such that the internal temperature did not exceed 80° C. The internal temperature was raised to 205° C. over 2 hours while removing toluene and the distilled water. The reaction was carried out at 205° C. for 10 hours, allowed to cool, 100 parts of toluene and 64 parts of 30% sodium hydroxide aqueous solution were added, and the mixture was stirred at room temperature for 6 hours. The organic layer was washed five times with 100 parts of water, and the solvent and excess aniline were distilled off under heating and reduced pressure to obtain 19 parts of an amine resin (A-1) as a brown solid resin (Mn: 1056, Mw: 1917). The amine equivalent was 518 g/eq. A GPC chart of the obtained amine resin is shown in FIG. 3. Furthermore, the $^1$H-NMR data ($CDCl_3$) of the obtained amine resin is shown in FIG. 4. An amino-group-derived signal was observed at 4.85 ppm in the $^1$H-NMR chart.

Example 2

Figure 5:
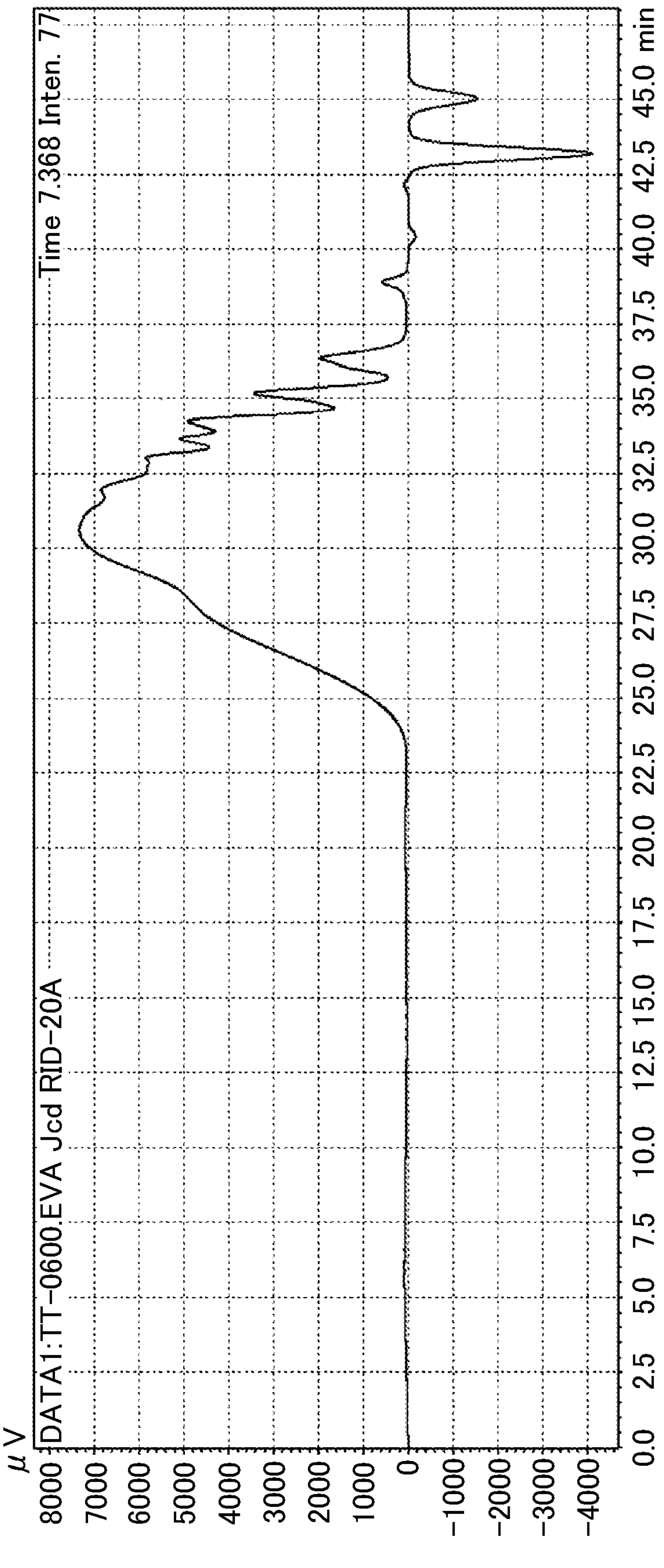
FIG. 5 shows a GPC chart of Example 2.
Figure 6:
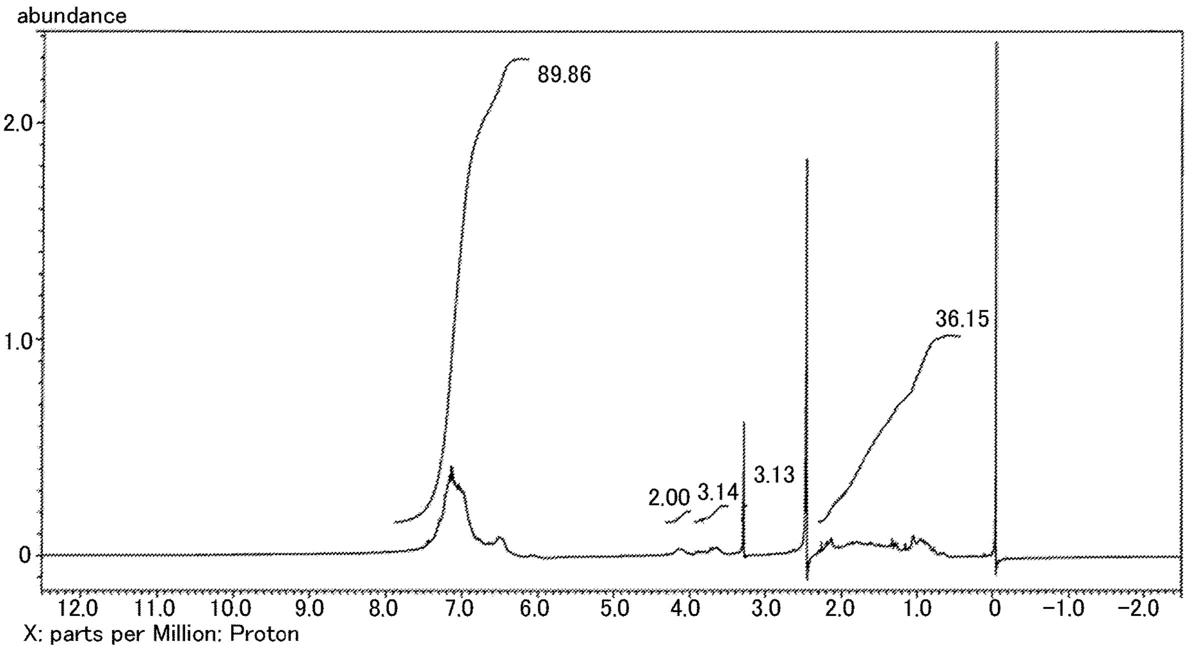
FIG. 6 shows a $^1$H-NMR chart of Example 2.
Figure 7:
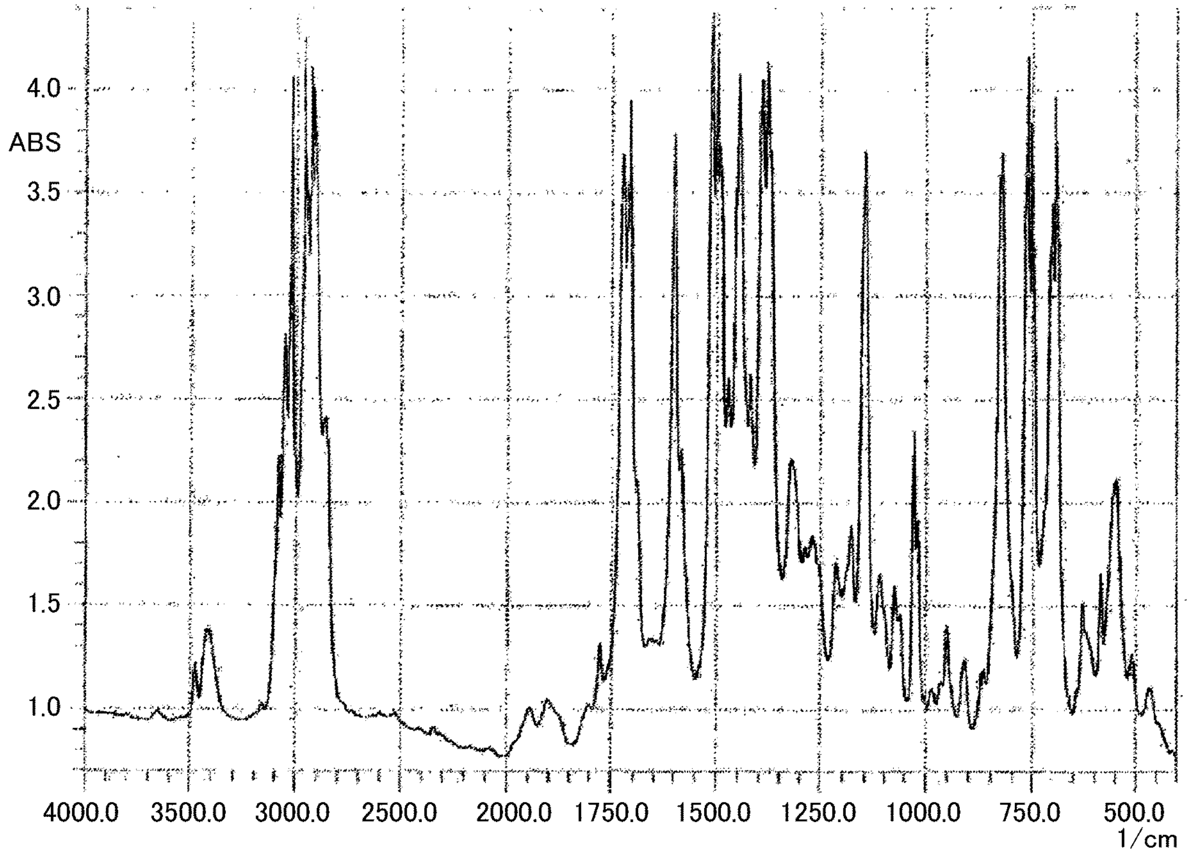
FIG. 7 shows an FT-IR chart of Example 2.

4.3 parts of maleic anhydride, 90 parts of toluene, 10 parts of NMP, and 0.3 parts of methanesulfonic acid were added to a flask equipped with a thermometer, a Dean Stark azeotropic distillation trap, a condenser, a stirrer, and a dropping funnel, and the internal temperature was raised to 115° C. Next, an amine resin solution (a solution composed of 15 parts of amine resin A-1 obtained in Example 1 and 100 parts of toluene) was dropped over 2 hours using a dropping funnel. After completion of the dropping, the reaction was continued under reflux conditions for 2 hours and allowed to cool. After cooling, the organic layer was washed five times with 100 parts of water, and the solvent was distilled off under heating and reduced pressure to obtain 15 parts of a maleimide resin (M-1) as a brown solid resin (Mn: 1199, Mw: 2312). A GPC chart of the obtained compound is shown in FIG. 5. Furthermore, the $^1$H-NMR data ($CDCl_3$) of the obtained maleimide resin is shown in FIG. 6. It was observed that the signal derived from the amino group of (A-1) observed at 4.85 ppm in the $^1$H-NMR chart disappeared. Furthermore, the FT-IR data (KBr method) of the obtained maleimide resin is shown in FIG. 7. A signal derived from the olefin of the maleimide group was observed at 1145 cm-1 of the FT-IR chart, and a signal derived from the carbonyl group of the maleimide group was observed at 1725 $cm^{-1}$.

Synthesis Example 2

Figure 8:
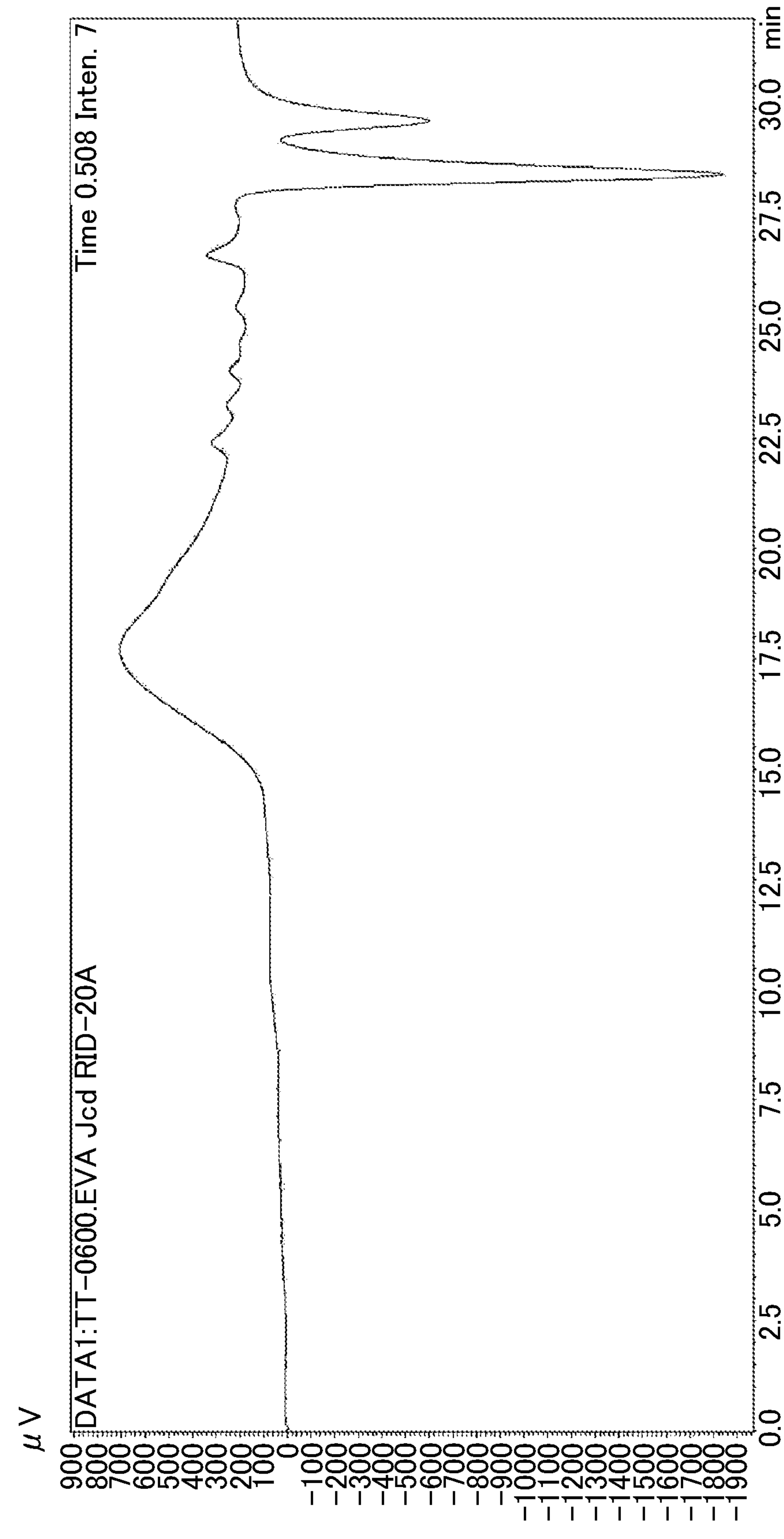
FIG. 8 shows a GPC chart of Synthesis Example 2.
Figure 9:
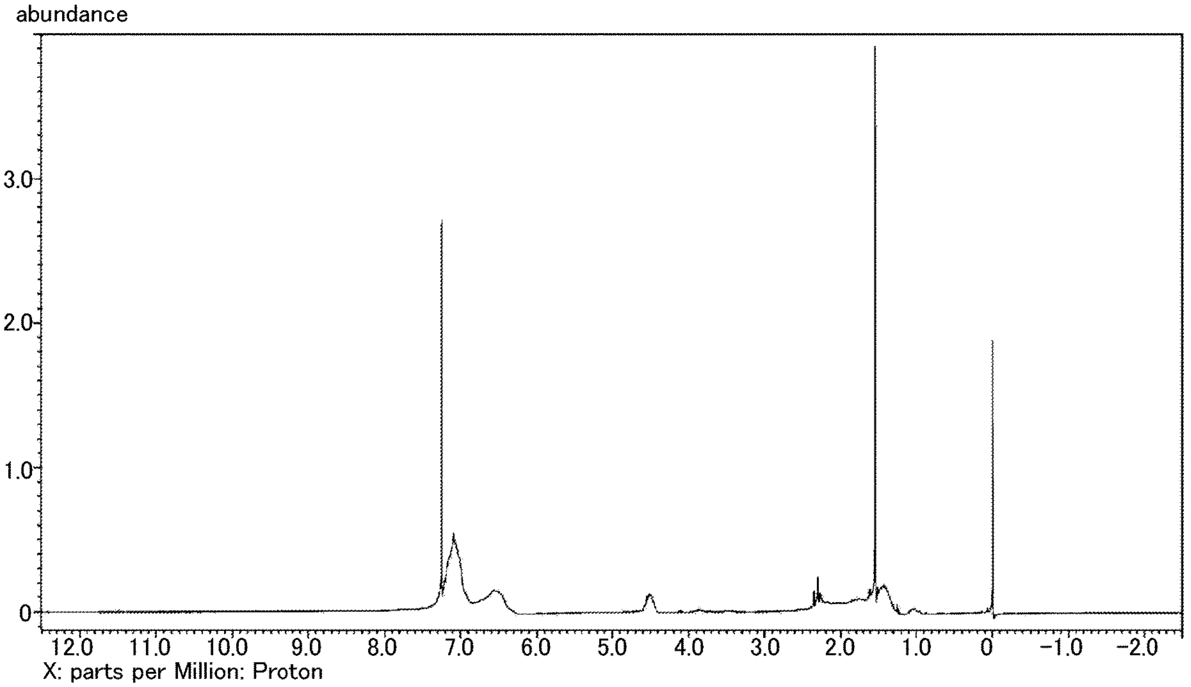
FIG. 9 shows a $^1$H-NMR chart of Synthesis Example 2.

40 parts of toluene and 1 part of a boron trifluoride-diethyl ether complex were added to a flask equipped with a thermometer, a condenser, a stirrer, and a dropping funnel, and nitrogen flow and stirring were started. Using a dropping funnel, a styrene-based compound mixture solution (a mixture of 39 parts of styrene (manufactured by Tokyo Chemical Industry Co., Ltd.) and 19 parts of chloromethylstyrene (manufactured by CMS-14:AGC Corporation)) was dropped over 2 hours so that the internal temperature did not exceed 28° C. The reaction was continued at 25° C. for 4 hours, then at 40° C. for 2 hours, and further at 70° C. for 1 hour. 50 parts of toluene was added, and washing with water was performed until the waste water became neutral. The solvent was distilled off from the resulting organic layer under heating and reduced pressure to obtain 55.3 parts of a polystyrene compound (St-2) having a chloromethyl group as a solid resin (Mn: 2699, Mw: 8533). A GPC chart of the obtained compound is shown in FIG. 8. A $^{1}$H-NMR chart ($CDCl_3$) of the obtained compound is shown in FIG. 9. A signal derived from the chloromethyl group was observed at 4.45 to 4.75 ppm in the $^{1}$H-NMR chart.

Example 3

Figure 10:
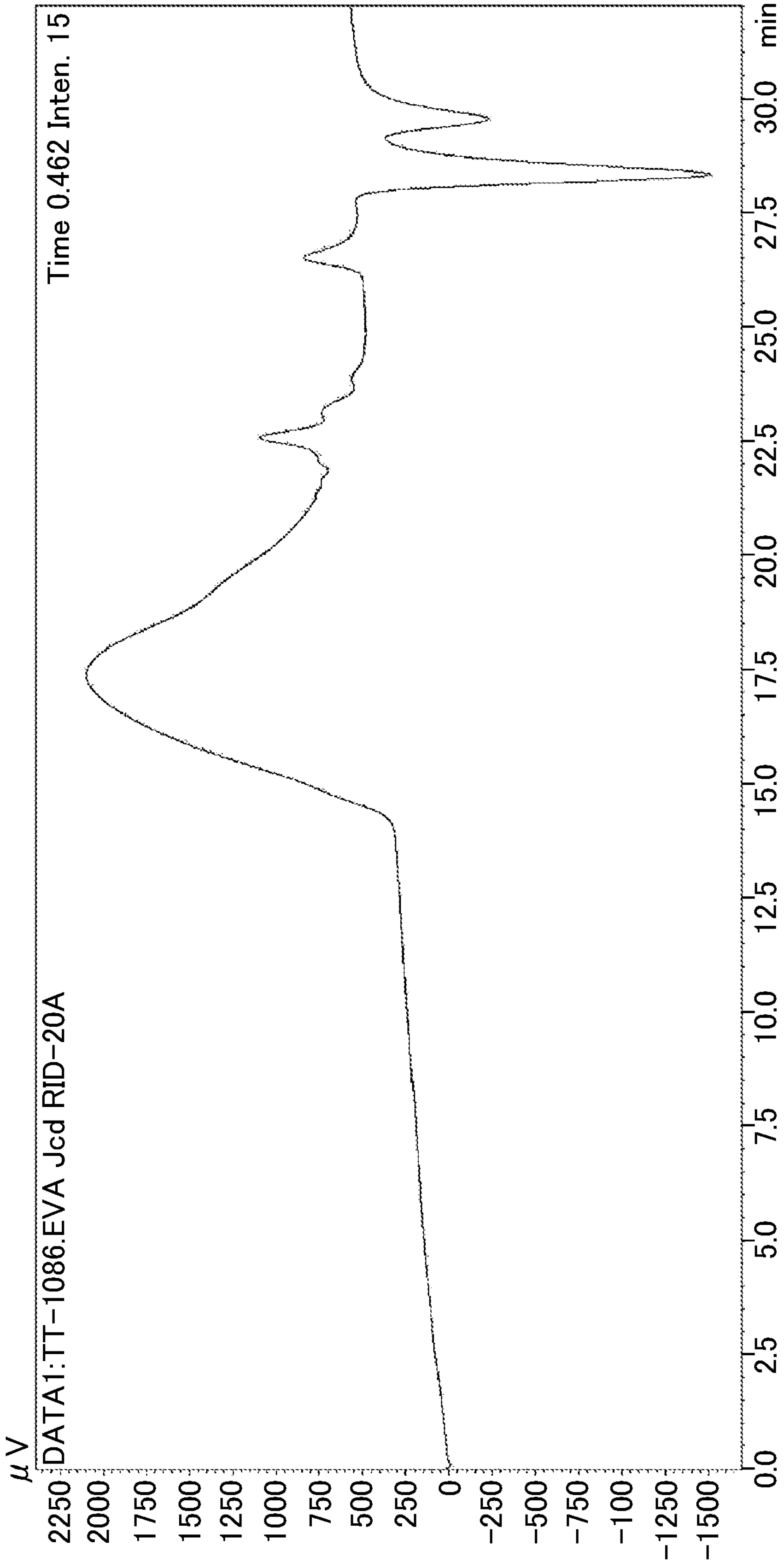
FIG. 10 shows a GPC chart of Example 3.
Figure 11:
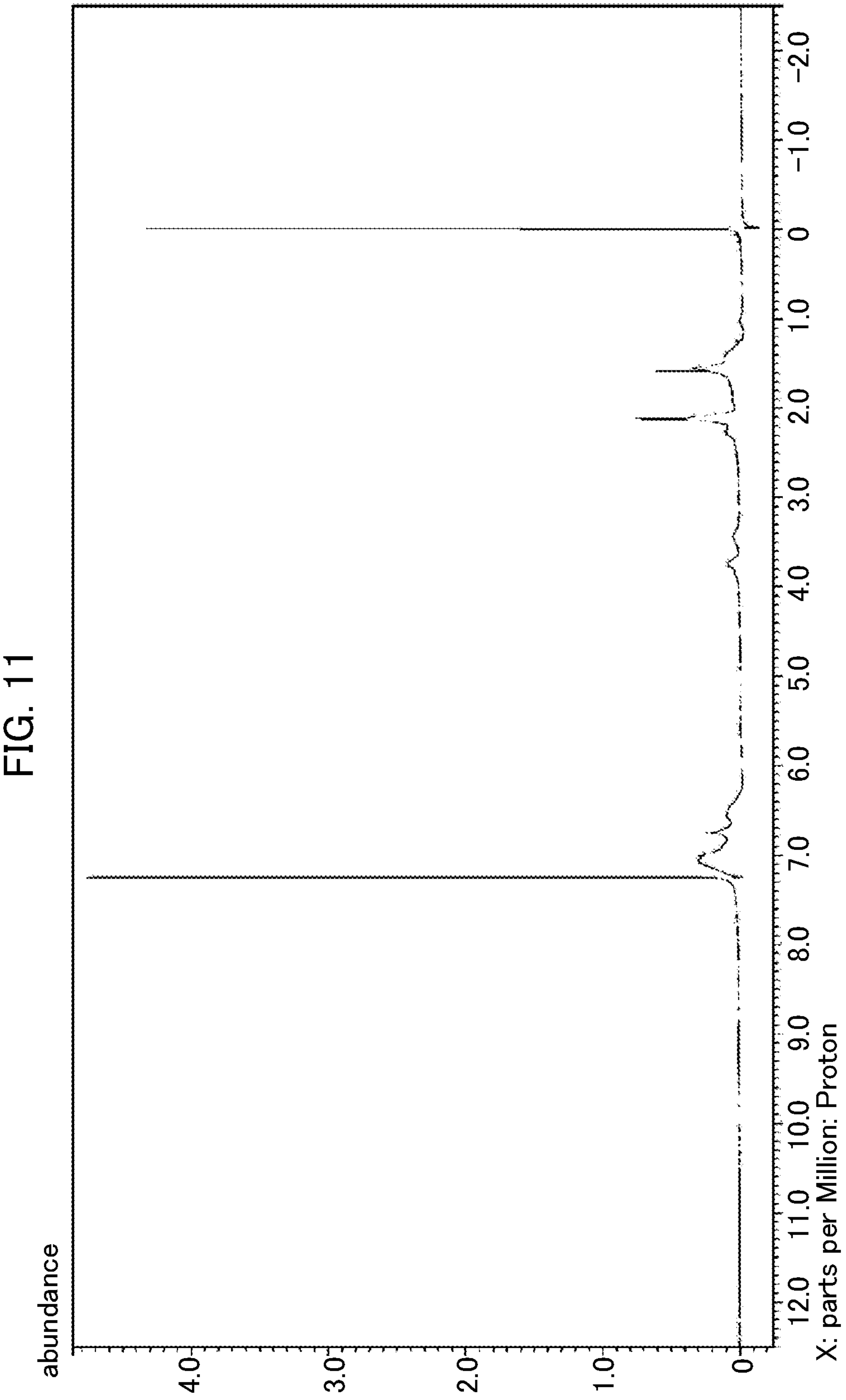
FIG. 11 shows a $^1$H-NMR chart of Example 3.

48.3 parts of St-2 obtained in Synthesis Example 2; 25 parts of toluene; and 100 parts of 2,6-dimethylaniline were added to a flask equipped with a thermometer, a Dean Stark azeotropic distillation trap, a condenser, a stirrer, and a dropping funnel, and the mixture was reacted at 65° C. for 2 hours. Using a dropping funnel, 10.4 parts of 35% hydrochloric acid was dropped such that the internal temperature did not exceed 80° C. The internal temperature was raised to 210° C. over 2 hours while removing toluene and the distilling water. The reaction was carried out at 210° C. for 10 hours, allowed to cool, 200 parts of toluene and 29.4 parts of a 30% sodium hydroxide aqueous solution were added, and the mixture was stirred at room temperature for 3 hours. The organic layer was washed three times with 100 parts of water, and the solvent and excess 2,6-dimethylaniline were distilled off under heating and reduced pressure to obtain 48.6 parts of an amine resin (A-2) as a brown solid resin (Mn: 4184, Mw: 19409). The amine equivalent was 607 g/eq. A GPC chart of the obtained amine resin is shown in FIG. 10. Furthermore, the $^{1}$H-NMR data ($CDCl_3$) of the obtained amine resin is shown in FIG. 11. A signal derived from the amino group was observed at 3.50 ppm in the $^{1}$H-NMR chart.

Example 4

Figure 12:
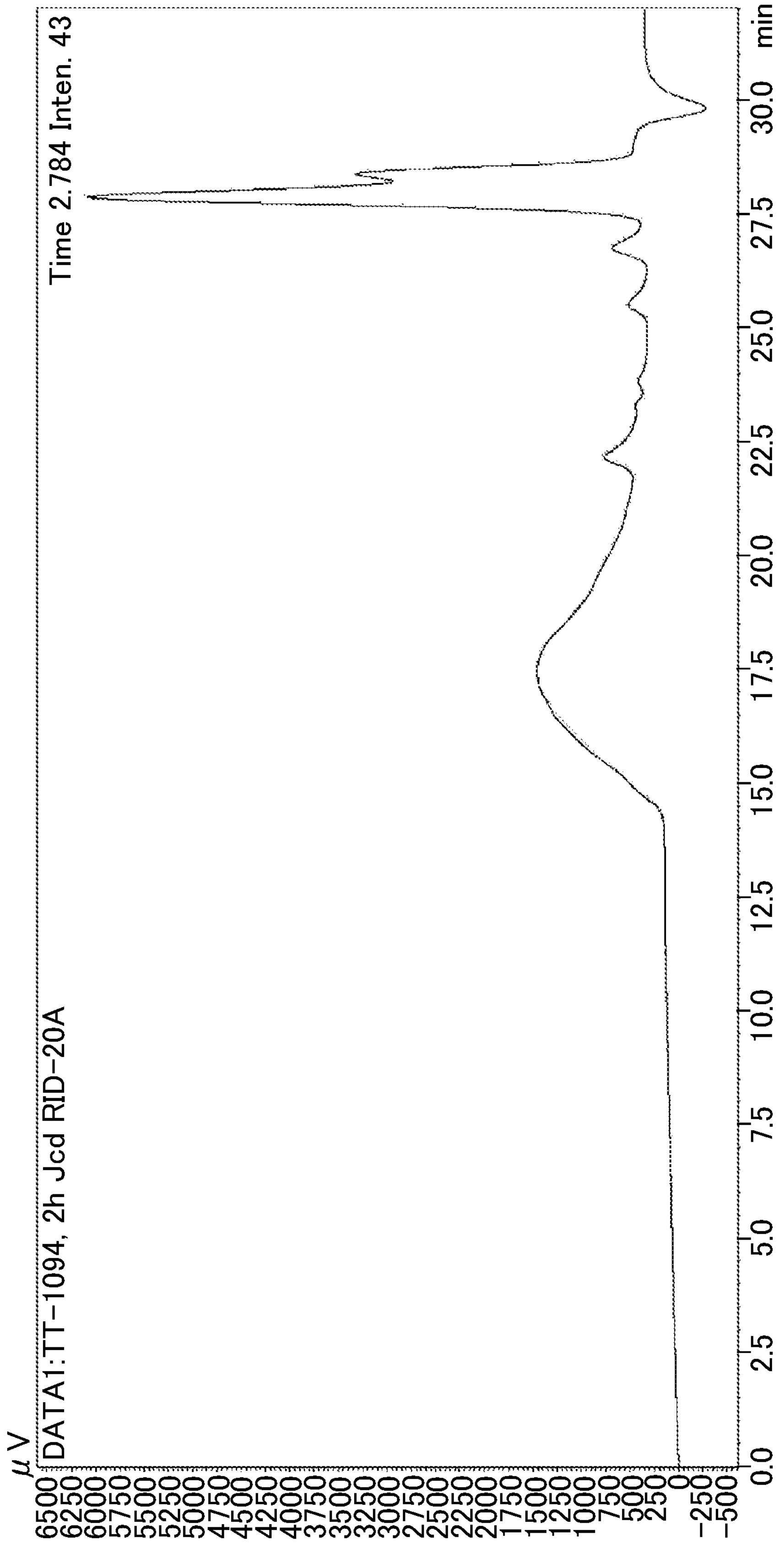
FIG. 12 shows a GPC chart of Example 4.
Figure 13:
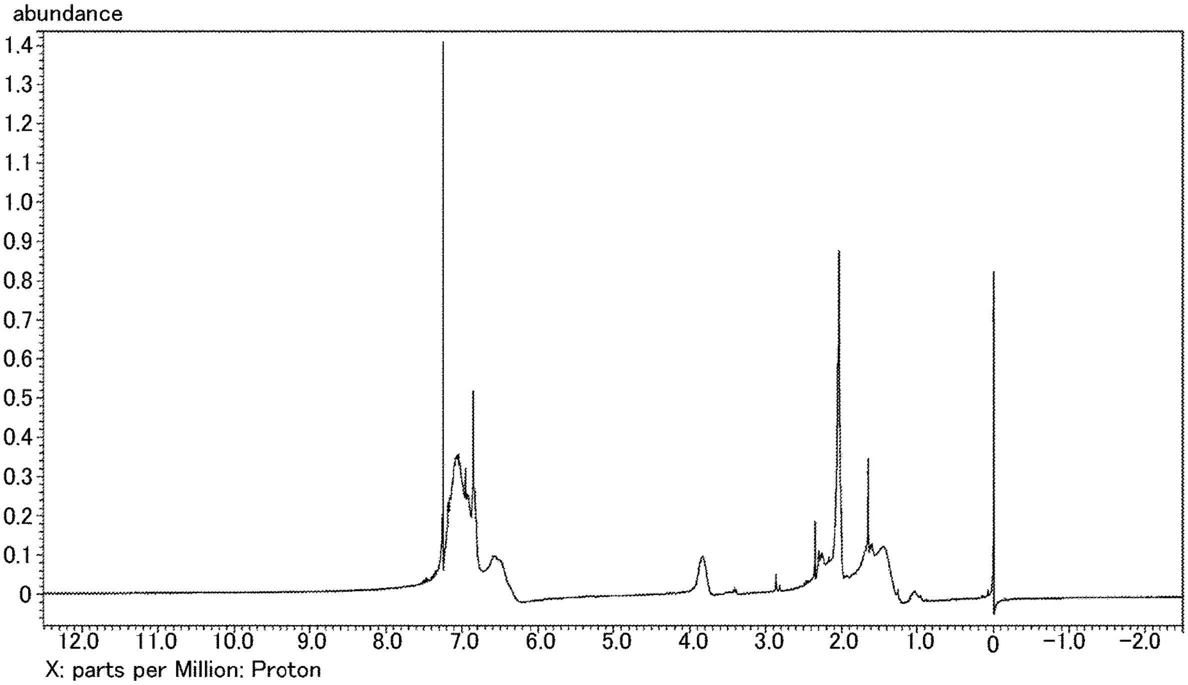
FIG. 13 shows a $^1$H-NMR chart of Example 4.

6.0 parts of maleic anhydride; 25 parts of toluene; 25 parts of NMP; and 0.5 parts of methanesulfonic acid were added to a flask equipped with a thermometer, a Dean Stark azeotropic distillation trap, a condenser, a stirrer, and a dropping funnel, and the internal temperature was raised to 115° C. Next, an amine resin solution (a solution composed of 25 parts of amine resin A-2 obtained in Example 4 and 25 parts of toluene) was dropped over 2 hours using a dropping funnel. After completion of the dropping, the reaction was continued under reflux conditions for 2 hours and allowed to cool. After cooling, the organic layer was washed five times with 100 parts of water, and the solvent was distilled off under heating and reduced pressure to obtain 24.4 parts of a maleimide resin (M-2) as a brown solid resin (Mn: 4077, Mw: 19849). A GPC chart of the obtained maleimide resin is shown in FIG. 12. Furthermore, the $^{1}$H-NMR data ($CDCl_3$) of the obtained maleimide resin is shown in FIG. 13. A signal derived from the maleimide group was observed at 6.85 ppm in the $^{1}$H-NMR chart.

Example 5

Figure 14:
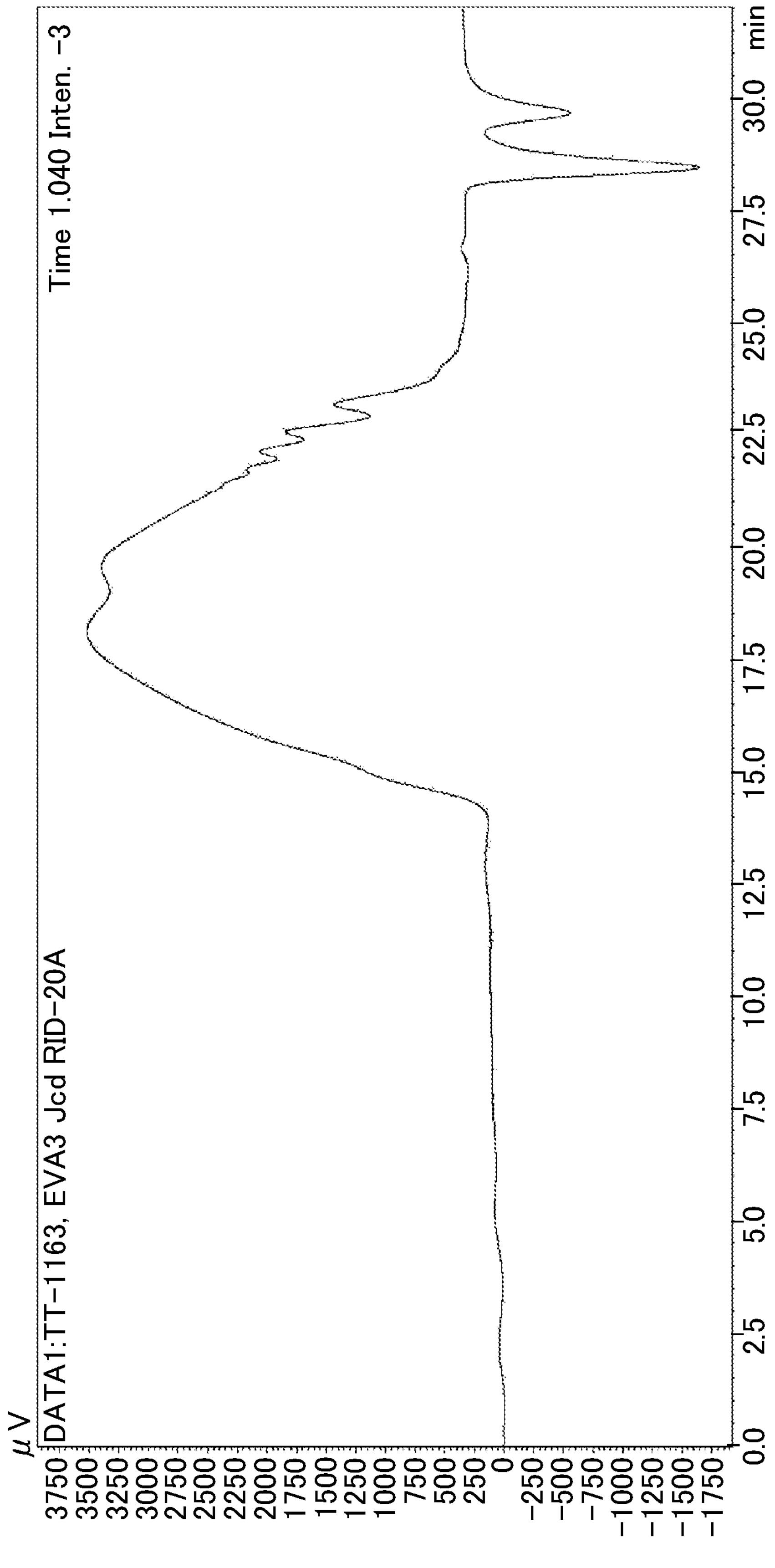
FIG. 14 shows a GPC chart of Example 5.
Figure 15:
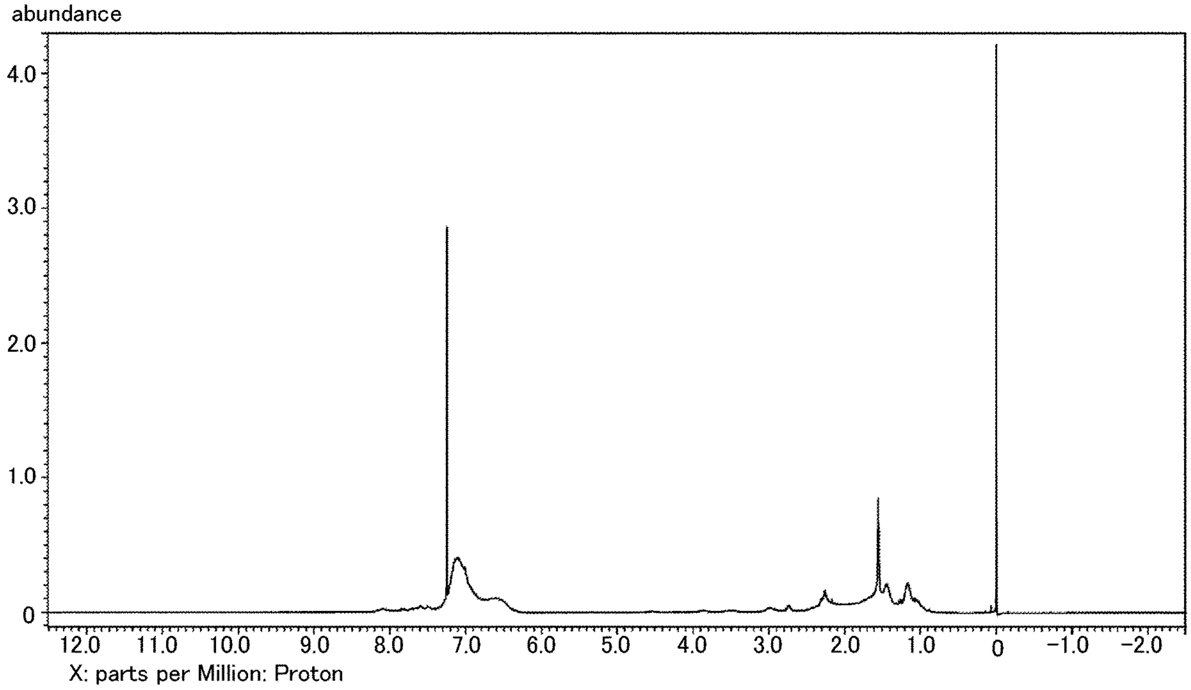
FIG. 15 shows a $^1$H-NMR chart of Example 5.

25 parts of St-2 obtained in Synthesis Example 2; 25 parts of toluene; and 200 parts of 2,6-diisopropylaniline were added to a flask equipped with a thermometer, a Dean-Stark azeotropic distillation trap, a condenser, a stirrer, and a dropping funnel, and the mixture was reacted at 65° C. for 3 hours. Using a dropping funnel, 10.6 parts of 35% hydrochloric acid was dropped such that the internal temperature did not exceed 80° C. The internal temperature was raised to 210° C. over 2 hours while removing toluene and the distilling water. The reaction was carried out at 210° C. for 10 hours, allowed to cool, 200 parts of toluene and 19.3 parts of a 30% sodium hydroxide aqueous solution were added, and the mixture was stirred at room temperature for 3 hours. The organic layer was washed three times with 100 parts of water, and the solvent and excess 2,6-diisopropylaniline were distilled off under heating and reduced pressure to obtain 25.6 parts of an amine resin (A-3) as a brown solid resin (Mn: 2933, Mw: 14708). The amine equivalent was 1178 g/eq. A GPC chart of the obtained amine resin is shown in FIG. 14. Furthermore, the $^{1}$H-NMR data ($CDCl_3$) of the obtained compound is shown in FIG. 15. A signal derived from the amino group was observed at 3.50 ppm in the $^{1}$H-NMR chart.

Example 6

Figure 16:
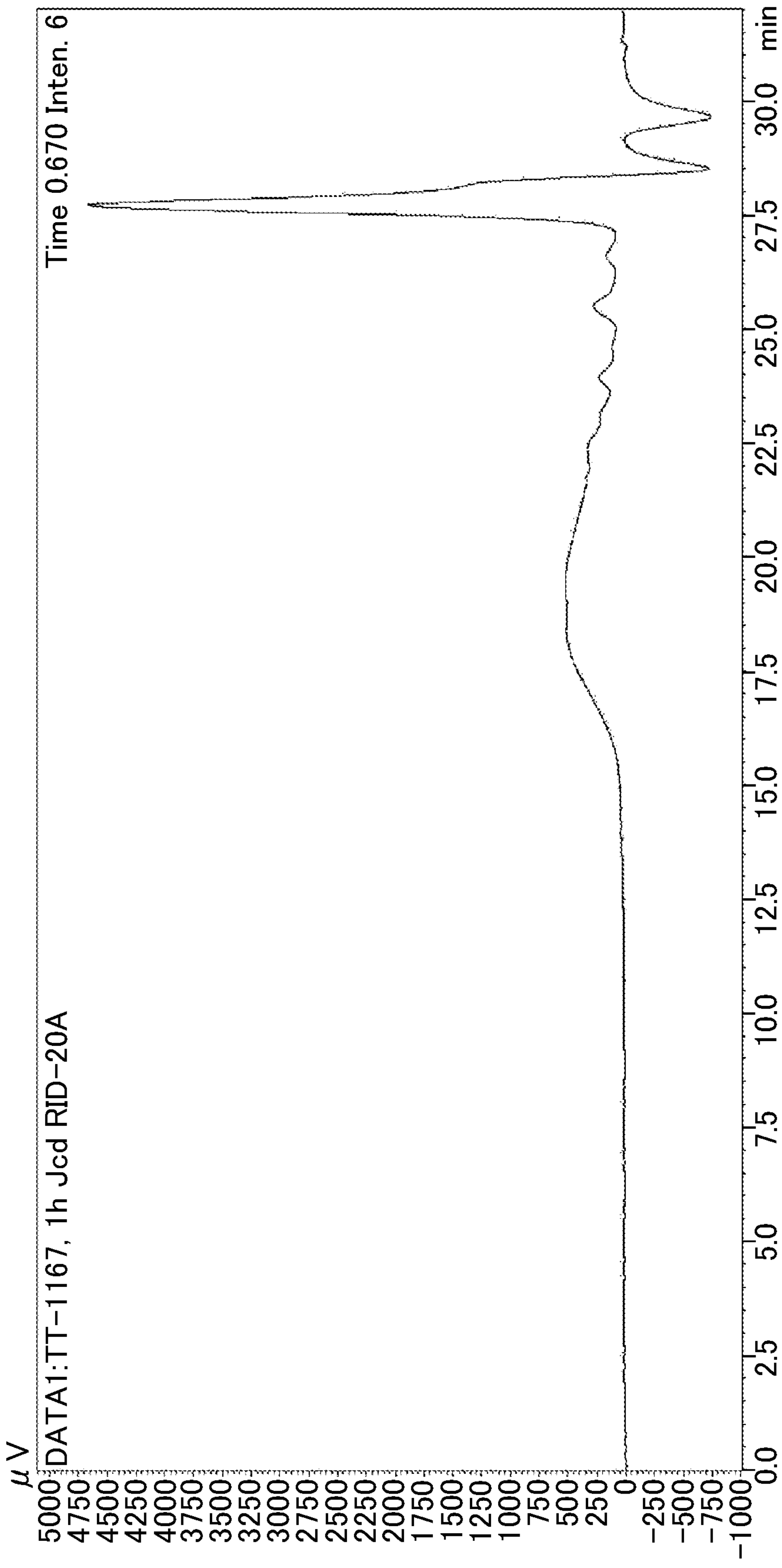
FIG. 16 shows a GPC chart of Example 6.
Figure 17:
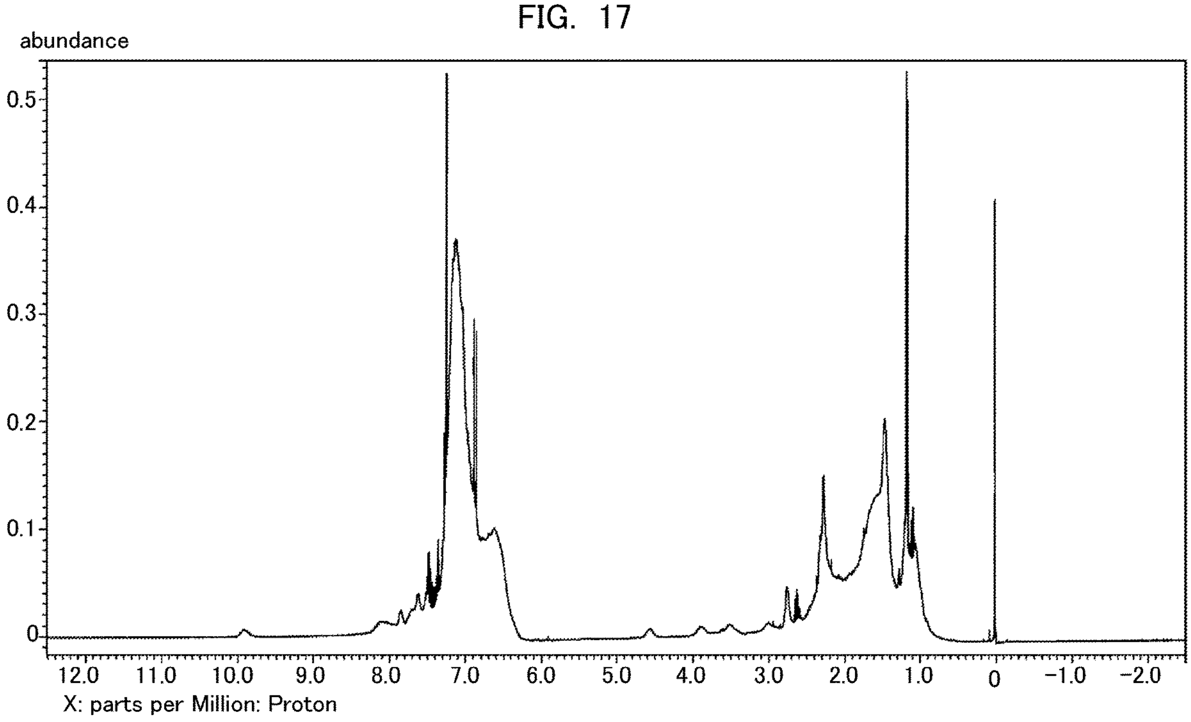
FIG. 17 shows a $^1$H-NMR chart of Example 6.

2.5 parts of maleic anhydride; 60 parts of toluene; 20 parts of NMP; and 0.4 parts of methanesulfonic acid were added to a flask equipped with a thermometer, a Dean-Stark azeotropic distillation trap tube, a condenser, a stirrer, and a dropping funnel, and the internal temperature was raised to 115° C. Next, an amine resin solution (a solution composed of 20 parts of amine resin A-3 obtained in Example 5 and 20 parts of toluene) was dropped over 2 hours using a dropping funnel. After completion of the dropping, the reaction was continued under reflux conditions for 3 hours and allowed to cool. After cooling, the organic layer was washed five times with 100 parts of water, and the solvent was distilled off under heating and reduced pressure to obtain 15.9 parts of a maleimide resin (M-3) as a brown solid resin (Mn: 2334, Mw: 18283). A GPC chart of the obtained maleimide resin is shown in FIG. 16. Furthermore, the $^{1}$H-NMR data ($CDCl_3$) of the obtained maleimide resin is shown in FIG. 17. A signal derived from the maleimide group was observed at 6.85 ppm in the $^{1}$H-NMR chart.

Example 7

The maleimide resin (M-1) obtained in Example 2 and 2E4MZ (2-ethyl-4-methylimidazole, manufactured by Shikoku Chemical Industry Co., Ltd.) as a curing accelerator were blended at the ratio (parts by mass) shown in Table 1, heat-melted and mixed in a metal container, poured into a mold as it was, and cured at 220° C. for 2 hours. The measurement results are shown in Table 1.

Comparative Example 1

A biphenyl aralkyl type epoxy resin (NC-3000-L, manufactured by Nippon Kayaku Co., Ltd.), a biphenyl aralkyl type phenolic resin (KAYAHARD GPH-65, manufactured by Nippon Kayaku Co., Ltd.), and 2E4MZ (2-ethyl-4-methylimidazole, manufactured by Shikoku Chemical Industry Co., Ltd.) as a curing accelerator were blended at the ratio (parts by mass) shown in Table 1, heat-melted and mixed in a metal container, poured into a mold as it was, and the mixture was heated at 160° C. for 2 hours and then cured at 180° C. for 6 hours. The measurement results are shown in Table 1.

Example 8

The maleimide resin (M-2) obtained in Example 4 and 2E4MZ (2-ethyl-4-methylimidazole, manufactured by Shikoku Chemical Industry Co., Ltd.) as a curing accelerator were blended at the ratio (parts by mass) in Table 2. The mixture was vacuum press-molded while sandwiching the mixture between specular copper foils (T4X: manufactured by Fukuda Metal Copper Foil Co., Ltd.), and cured at 220° C. for 2 hours. At this time, a spacer was used in which the center of a cushion paper having a thickness of 250 μm was hollowed out to a length and width of 150 mm. A laser cutter was used as necessary to cut out a test piece of a desired size for the evaluation, and evaluation was performed. The evaluation results are shown in Table 2.

Comparative Example 2

A biphenyl aralkyl type epoxy resin (NC-3000-L, manufactured by Nippon Kayaku Co., Ltd.) and 2E4MZ (2-ethyl-4-methylimidazole, manufactured by Shikoku Chemical Industry Co., Ltd.) as a curing accelerator were blended at the ratio (parts by mass) shown in Table 2. The mixture was vacuum press-molded while sandwiching the mixture between specular copper foils (T4X: manufactured by Fukuda Metal Copper Foil Co., Ltd.), and cured at 220° C. for 2 hours. At this time, a spacer was used in which the center of a cushion paper having a thickness of 250 μm was hollowed out to a length and width of 150 mm. A laser cutter was used as necessary to cut out a test piece of a desired size for the evaluation, and evaluation was performed. The evaluation results are shown in Table 2.

<Heat Resistance Test>

Glass transition temperature: temperature when tan 6 is the maximum value was measured by a dynamic viscoelasticity tester.

Dynamic viscoelasticity measuring instrument: DMA-2980 manufactured by TA-Instruments Measurement temperature range: −30° C. to 280° C.

Heating rate: 2° C./min

Frequency: 10 Hz

Test piece size: A piece cut into 5 mm×50 mm was used (thickness is about 800 μm).

Tg: The peak point of tan 6 (=loss elastic modulus/storage elastic modulus) was defined as Tg.

<Dielectric Constant Test and Dielectric Loss Tangent Test>

A test was performed by a cavity resonator perturbation method using a 1 GHz (Example 8) or 10 GHz (Comparative Example 2) cavity resonator manufactured by AET. The sample size was 1.7 mm in width and 100 mm in length, and the thickness was 1.7 mm.

TABLE 1

| Blending Amount | | Example 7 | Comparative Example 1 |
|---|---|---|---|
| Maleimide Resin | M-1 | 100 | |
| Epoxy Resin | NC-3000-L | | 100 |
| Phenolic Resin | GPH-65 | | 74 |
| Imidazole | 2E4MZ | 1.0 | 2.6 |
| | Evaluation Test Result | | |
| Glass Transition Temperature | ° C. | 148 | 141 |
| Permittivity | 1 GHz | 2.4 | 3.1 |
| Loss Tangent | 1 GHz | 0.0008 | 0.018 |

TABLE 2

| Blending Amount | | Example 8 | Comparative Example 2 |
|---|---|---|---|
| Maleimide Resin | M-2 | 100 | |
| Epoxy Resin | NC-3000-L | | 100 |
| Imidazole | 2E4MZ | 1.0 | 1.0 |
| | Evaluation Test Result | | |
| Glass Transition Temperature | ° C. | 223 | 147 |
| Permittivity | 10 GHz | 2.5 | 2.9 |
| Loss Tangent | 10 GHz | 0.001 | 0.019 |

From Tables 1 and 2, it was confirmed that Examples 7 and 8 had good heat resistance and excellent dielectric properties.

The present application is based on U.S. Provisional Application No. 63/188,688 filed on May 14, 2021.

INDUSTRIAL APPLICABILITY

The olefin compound having a styrene structure of the present invention is useful for insulating materials for electric and electronic components (such as high-reliability semiconductor sealing materials) and laminated boards (such as printed wiring boards, BGA substrates, and build-up substrates), adhesives (such as conductive adhesives), various composite materials including CFRP, coating materials, 3D printing, and the like.

The invention claimed is:

1. A maleimide resin having repeating units of the following formulae (a), (b), and (c):

(a)

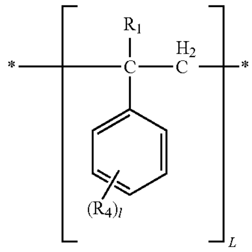

-continued (b)

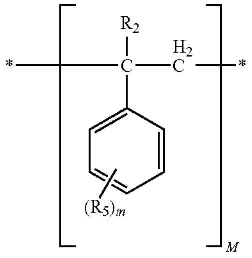

(c)

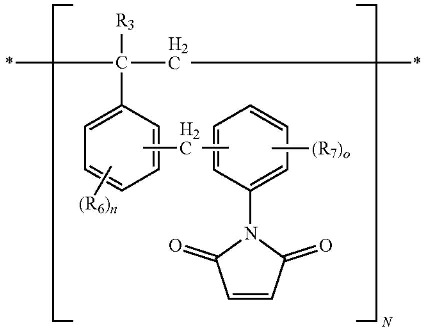

in the above formulae, $R_1$ to $R_7$ represent a hydrogen atom, a hydrocarbon group having 1 to 10 carbon atoms, or a halogenated alkyl group;

"l" and "m" each represent a real number of 0 to 5;

"n" and "o" represent a real number of 0 to 4;

each of L and M independently represents a real number of 0 to 20;

N represents a real number of 1 to 20;

(a), (b), and (c) are joined by *, respectively; and the repeating positions may be random.

2. The maleimide resin according to claim 1, wherein:

in the above formulae (a), (b), and (c), $R_1$ is a methyl group, $R_2$ is a hydrogen atom, and $R_3$ is a methyl group or a hydrogen atom.

3. A maleimide resin obtained by a reaction of an amine resin having repeating units of the following formula (a), (b), and (d) with maleic acid or maleic anhydride:

(a)

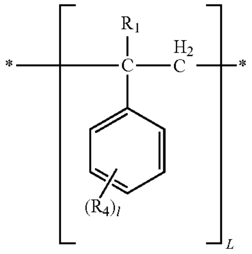

(b)

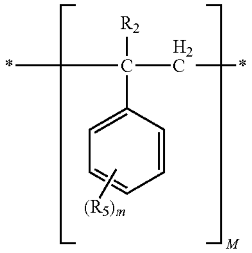

-continued (d)

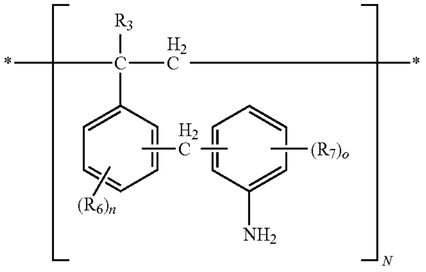

in the above formulae, $R_1$ to $R_7$ represent a hydrogen atom, a hydrocarbon group having 1 to 10 carbon atoms, or a halogenated alkyl group;

"l" and "m" each represent a real number of 0 to 5;

"n" and "o" represent a real number of 0 to 4;

each of L and M independently represents a real number of 0 to 20;

N represents a real number of 1 to 20; and (a), (b), and (d) are joined by *, respectively, and the repeating positions may be random.

4. A curable resin composition containing the maleimide resin according to claim 1.

5. The curable resin composition according to claim 4, further comprising a curable resin other than the maleimide resin.

6. The curable resin composition according to claim 4, further comprising a curing accelerator.

7. A cured product obtained by curing the maleimide resin according to claim 1.

8. An amine resin having repeating units of the following formula (a), (b), and (d):

(a)

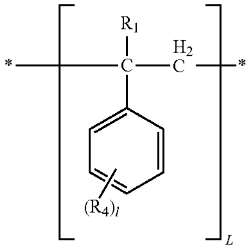

(b)

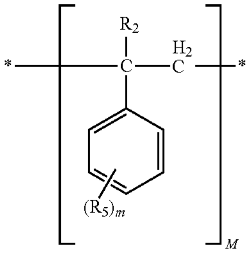

-continued (d)

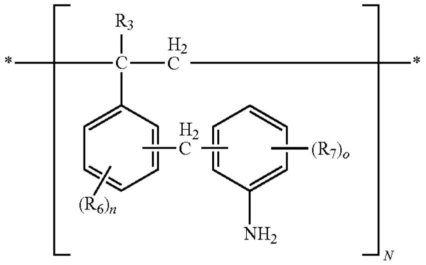

in formulae (a), (b), and (d), $R_1$ to $R_7$ represent a hydrogen atom, a hydrocarbon group having 1 to 10 carbon atoms, or a halogenated alkyl group;

"l" and "m" each represent a real number of 0 to 5;

"n" and "o" represent a real number of 0 to 4;

each of L and M independently represents a real number of 0 to 20;

N represents a real number of 1 to 20;

(a), (b), and (d) are joined by *, respectively; and the repeating positions may be random.

9. The amine resin according to claim 8, wherein:

in the above formulae (a), (b), and (c), $R_1$ is a methyl group, $R_2$ is a hydrogen atom, and $R_3$ is a methyl group or a hydrogen atom.

10. A curable resin composition containing the maleimide resin according to claim 2.

11. A curable resin composition containing the maleimide resin according to claim 3.

12. The curable resin composition according to claim 10, further comprising a curable resin other than the maleimide resin.

13. The curable resin composition according to claim 11, further comprising a curable resin other than the maleimide resin.

14. The curable resin composition according to claim 10, further comprising a curing accelerator.

15. The curable resin composition according to claim 11, further comprising a curing accelerator.

16. The curable resin composition according to claim 12, further comprising a curing accelerator.

17. The curable resin composition according to claim 13, further comprising a curing accelerator.

18. A cured product obtained by curing the maleimide resin according to claim 2.

19. A cured product obtained by curing the maleimide resin according to claim 3.

20. A cured product obtained by curing the curable resin composition according to claim 4.

* * * * *